United States Patent
Zigras et al.

(10) Patent No.: US 12,192,254 B2
(45) Date of Patent: Jan. 7, 2025

(54) DEVICES, METHODS, AND SYSTEMS FOR PRESENTATION BY A HOST ELECTRONIC DEVICE OF MEDIA CONTENT OUTPUT FROM AN APPLICATION OPERATING LOCALLY ON A GUEST ELECTRONIC DEVICE

(71) Applicant: Motorola Mobility LLC, Chicago, IL (US)

(72) Inventors: Ioannis A. Zigras, Chicago, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/211,141

(22) Filed: Jun. 16, 2023

(65) Prior Publication Data

US 2024/0388612 A1   Nov. 21, 2024

(51) Int. Cl.
| | | |
|---|---|---|
| H04L 12/58 | (2006.01) | |
| H04L 9/40 | (2022.01) | |
| H04L 12/24 | (2006.01) | |
| H04L 65/401 | (2022.01) | |
| H04L 67/025 | (2022.01) | |
| H04L 51/08 | (2022.01) | |
| H04L 51/10 | (2022.01) | |

(52) U.S. Cl.
CPC ...... *H04L 65/4015* (2013.01); *H04L 63/0838* (2013.01); *H04L 67/025* (2013.01)

(58) Field of Classification Search
CPC ............ H04L 65/4015; H04L 63/0838; H04L 67/025; H04L 12/58; H04L 12/24; H04L 51/10; H04L 51/08

USPC .......................................................... 709/217
See application file for complete search history.

(56) References Cited

U.S. PATENT DOCUMENTS

| | | | |
|---|---|---|---|
| 7,302,468 B2 | 11/2007 | Wijeratne | |
| 2003/0083944 A1* | 5/2003 | Duvall | G06Q 30/06 705/21 |
| 2014/0108796 A1* | 4/2014 | Johnson | G06F 21/6218 713/167 |
| 2016/0323219 A1* | 11/2016 | Brecx | G06Q 50/01 |
| 2016/0357151 A1* | 12/2016 | Block | G04B 19/24 |
| 2016/0357282 A1* | 12/2016 | Block | G06F 3/14 |
| 2016/0357413 A1* | 12/2016 | Block | G06F 3/04845 |
| 2016/0359666 A1* | 12/2016 | Ledwith | H04L 67/06 |
| 2017/0237558 A1* | 8/2017 | Yuan | H04L 9/12 380/279 |
| 2017/0331869 A1* | 11/2017 | Bendahan | H04L 65/612 |
| 2020/0226277 A1* | 7/2020 | Roden | G06N 5/046 |
| 2021/0294487 A1* | 9/2021 | Block | G06F 9/445 |

(Continued)

*Primary Examiner* — Jude Jean Gilles
(74) *Attorney, Agent, or Firm* — Philip H. Burrus, IV

(57) ABSTRACT

One or more guest electronic devices establish electronic communication with a host electronic device. The guest electronic devices transmit requests requesting presentation of media content from an application operating locally on each guest electronic device. The host electronic device arranges the requests in a queue. One or more processors of the host electronic device select a principal request from the queue and initiate the application operating locally on a guest electronic device identified by the principal request, thereby causing delivery of the media content from the guest electronic device identified by the principal request to the host electronic device.

20 Claims, 10 Drawing Sheets

(56) References Cited

U.S. PATENT DOCUMENTS

2021/0359999 A1* 11/2021 Carnahan .............. G06N 20/00
2022/0150570 A1* 5/2022 Weerasinghe ... H04N 21/47805

* cited by examiner

DEVICES, METHODS, AND SYSTEMS FOR PRESENTATION BY A HOST ELECTRONIC DEVICE OF MEDIA CONTENT OUTPUT FROM AN APPLICATION OPERATING LOCALLY ON A GUEST ELECTRONIC DEVICE

CROSS REFERENCE TO PRIOR APPLICATIONS

This application claims priority and benefit under 35 U.S.C. § 119 from Greek patent application No. 20230100399, filed May 16, 2023, which is incorporated by reference by rule in accordance with 37 CFR § 1.57.

BACKGROUND

Technical Field

This disclosure relates generally to wireless communication devices, and more particularly to wireless communication devices having applications operating thereon capable of generating media content.

Background Art

The advanced processing power available in modern electronic communication devices, examples of which include smartphones, tablet computers, and laptop computers, enable voice, text, image, and video communications between people. Additionally, such devices can operate applications capable of allowing users to engage in videoconferences, stream content such as movies, videos, and television shows, play music, and output other forms of entertainment. In addition to being tools for communicating with friends, family, and work colleagues, these devices are also real-time multimedia content entertainment devices.

Some electronic devices are equipped with a content redirection feature that allows this multimedia content to stream through a first device, such as a smartphone, and then to be redirected to a second device. The second device may have a larger display, more powerful loudspeakers, or other advantages not offered by the device upon which the application generating the content is operating. This feature can make content such as movies, television shows, and videoconferences easier to see and hear. While a neat feature for an individual user, the feature may not lend itself well to group settings. It would be advantageous to have electronic devices, methods, and systems suitable for use in group situations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
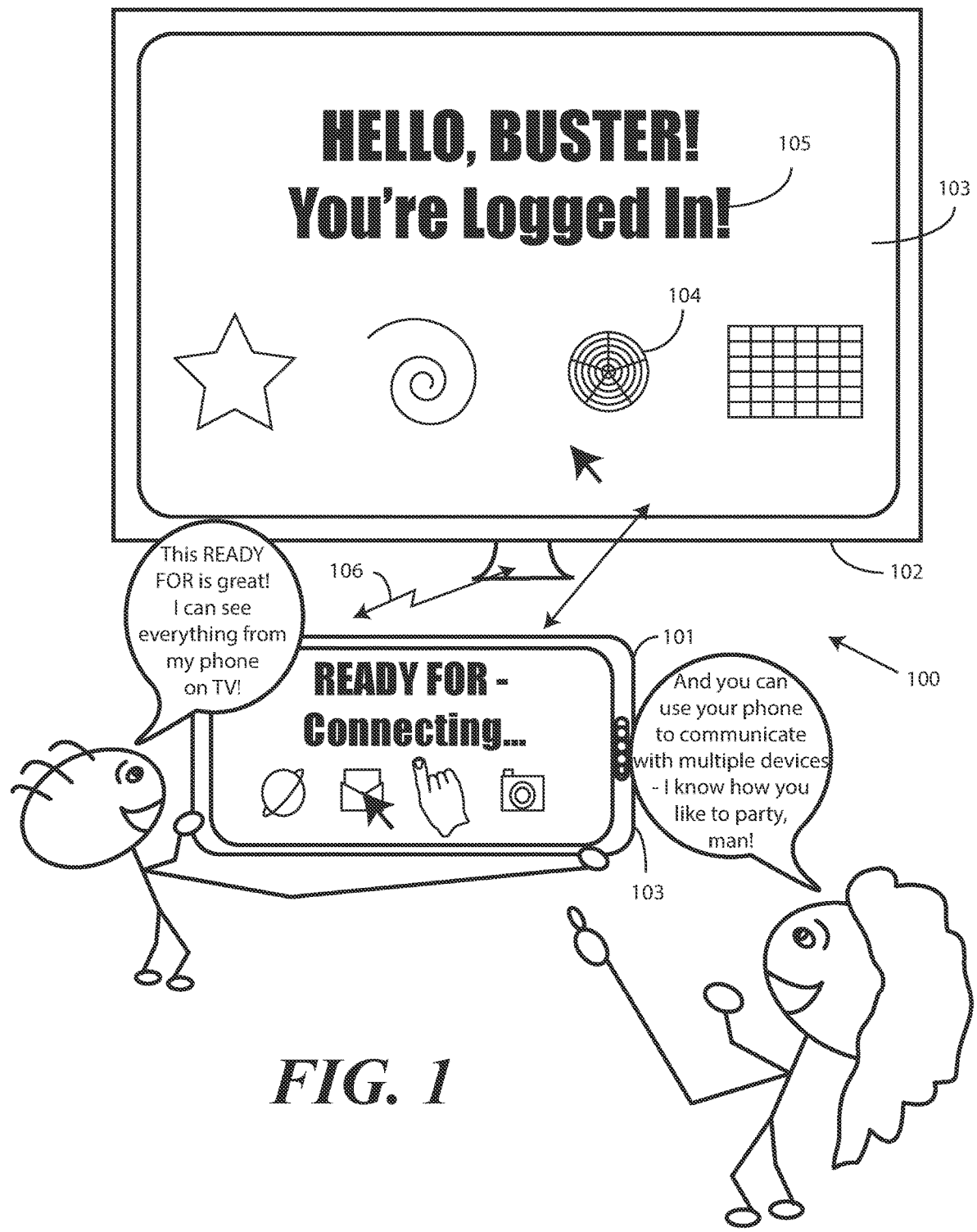
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to a host electronic device establishing electronic communication with a plurality of guest electronic devices, receiving a first request requesting presentation of media content output from an application operating locally on a first guest electronic device from the first guest electronic device and a second request requesting presentation of other media content output from another application operating locally on a second guest electronic device from the second guest electronic device, arranging the first request and the second request in a queue, selecting a principal request from the queue, and initiating one of the application operating locally on the first guest electronic device or the other application operating locally on the second guest electronic device depending upon which is identified by the principal request from the queue. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of arranging requests for presentation of media content from application operating locally on each guest electronic device of a plurality of guest electronic devices received by a communication device in a queue and, when a principal request is selected, causing a communication device to initiate an application identified by the principal request, thereby causing the media content identified by the principal request to be delivered to the communication device as described herein. The non-processor circuits may include, but are not limited to, a radio receiver, a radio transmitter, signal drivers, clock circuits, power source circuits, and user input devices.

As such, these functions may be interpreted as steps of a method to perform receiving requests for presentation of media content generated by applications operating locally on a plurality of guest electronic devices in an environment where both a host electronic device and the plurality of guest electronic devices are situated, arranging the requests in a queue in accordance with a prioritization, selecting a principal request, and causing an application identified by the principal request to generate the media content locally on a guest electronic device identified by the principal request. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

During group settings, examples of which include social gatherings such as parties, banquets, awards ceremonies, and even school classrooms, a host has a lot to do. Illustrating by example, at a party where the host is playing music using an electronic device, the host is often burdened by the guests with numerous requests to play various songs. Choosing which song to play consumes the host's limited and valuable time. Moreover, in many instances it can be challenging for a particular guest to capture the host's attention to make the request. If Amit desperately wants to hear "The Summer of '69," he may have a difficult time capturing the hosts attention in an effort to convince the host that Bryan Adams is indeed what the people want to hear.

Embodiments of the disclosure provide a solution to this dilemma. In accordance with embodiments of the disclosure, to free the precious time of both the host and guests, attendees of a social gathering can cause media content to be output by an application operating locally on their respective devices, through a host electronic device, to a group output device such as a set of loudspeakers, a display, or a projector. In one or more embodiments, the details of each guest's media content selection, e.g., media content identifier, application operating locally on the guest device, requested time slice for the host electronic device to initiate output of the media content, and so forth, are transmitted to the host electronic device. In one or more embodiments, each guest and/or the host can then manipulate the order of the media content items in a queue stored by the host electronic device, depending upon user settings. In one or more embodiments, the queue can be displayed on a content presentation companion device, examples of which include a large display, a projector, or an auxiliary monitor. In one or more embodiments, the entries in the queue can be manipulated via the content presentation companion device.

If, for example, the social setting is a party and a host electronic device is operating with a companion device such as a set of auditorium loudspeakers, when a particular request for presentation of media content from applications operating locally on a guest device becomes a principal request, one or more processors of the host electronic device can cause, using a communication device of the host electronic device, the application identified by the principal request to generate the media content locally on a guest electronic device identified by the principal request. The communication device of the host electronic device can then receive the media content from the application identified by the principal request operating locally on a guest electronic device and can cause the media content to be delivered to the loudspeakers for presentation to the group. If Amit, a guest, sends a request to the host, Yannis, to play "The Summer of '69" at 3:15 PM, presuming Yannis leaves this entry in the queue at this time slice, when 3:15 rolls around Yannis's device will cause a music player operating locally on Amit's device to start playing this iconic anthem speaking poetically of that first real six-string purchased at that archetypal five and dime. Yanni's device will then redirect these harmonious lyrics to the loudspeakers to the joy and glee of the entire group.

In one or more embodiments, a host electronic device establishes, using a communication device of the host electronic device, electronic communication with at least a first guest electronic device and a second guest electronic device. The host electronic device receives, with the communication device, at least a first request requesting presentation of media content output from an application operating locally on the first guest electronic device and a second request requesting presentation of other media content output from another application operating locally on the second guest electronic device from the second guest electronic device. In one or more embodiments, the one or more processors of the host electronic device arrange the first request and the second request in a queue stored by the host electronic device.

In one or more embodiments, the queue can be captured and cast and shared to a content presentation companion device. Illustrating by example, if the content presentation companion device is a large monitor or a projector, in one or more embodiments the queue can be delivered to the content presentation companion device for presentation to the group. This allows Amit, if his song were third in the queue for example, to make a quick run to the punch bowl to ladle up another round of libations before Bryan started to opine about summers seeming to last forever.

In one or more embodiments, the one or more processors of the host electronic device then select a principal request from the queue. The one or more processors can the initiation the application operating locally on the first guest electronic device, thereby causing the communication device to receive the media content when the principal request is the first request. Alternatively, when the principal request is the second request, the one or more processors can initiate the other application operating locally on the second guest electronic device to receive the other media content and so forth.

In one or more embodiments, the host electronic device is connected to a content presentation companion device such as a set of loudspeakers. In one or more embodiments, the host electronic device receives the various requests for presentation of media content from the various guest electronic devices identifying not only the media content but also the application operating locally on the guest electronic device requesting the media content. Illustrating by example, a guest may press "play" on an "audio in" device that causes a song to be played immediately by the host electronic device if no queue is established by the loudspeakers.

Otherwise, the requests can be added to a queue in the host electronic device for presentation when each request becomes a principal request in the queue. When the host electronic device selects a particular request, the one or more processors of the host electronic device can cause the application operating locally on the guest electronic device to generate signals carrying the media content to be passed to the host electronic device and on to the loudspeakers, and so forth.

Thus, in one or more embodiments a host electronic device comprises a communication device in communication with a plurality of guest electronic devices. One or more processors of the host electronic device arrange request for presentation of media content from applications operating locally on each guest electronic device of the plurality of guest electronic devices in a queue. When a principal request is selected, the one or more processors of the host electronic device can cause the communication device to initiate an application operating locally on the guest electronic device identified by the principal request, thereby causing the media content identified by the principal request to be delivered to the host electronic device.

The guest electronic devices can perform unique operations in accordance with one or more embodiments as well. Illustrating by example, in one or more embodiments one or more processors of the guest electronic device identify a host electronic device operating within an environment of the guest electronic device. In one or more embodiments, this identification comprises a location detector identifying a location matching a calendar event received from the host electronic device and stored in a calendaring application operating locally on the guest electronic device. The guest electronic device can then establish electronic communication with the host electronic device.

In one or more embodiments, one or more processors of the guest electronic device then deliver to the host electronic device, using a communication device of the guest electronic device, a request for presentation of media content from applications operating locally on the guest electronic device. This request can indicate a time slice of a predefined event occurring in the environment of the guest electronic device during which the media content should be transmitted to the host electronic device. When that time comes, presuming the queue in the host electronic device is not manipulated, the communication device of the guest electronic device can receive an initiation command form the host electronic device initiating the application operating locally on the guest electronic device, thereby causing the communication device to transmit the media content to the host electronic device for presentation by the host electronic device.

Accordingly, in one or more embodiments a guest electronic device comprises one or more processors operable with one or more sensors. The one or more processors identify a host electronic device operating within an environment of the guest electronic device in response to signals from the one or more sensors. A communication device establishes electronic communication with the host electronic device in response to the one or more sensors identifying the heled operating within the environment of the guest electronic device.

In one or more embodiments, the one or more processors, in response to the communication device establishing electronic communication with the host electronic device, deliver a request requesting presentation, by the host electronic device, of media content output from an application operating locally on the guest electronic device during a time slice of a predefined event during which both the host electronic device and the guest electronic device are operating within the environment of the guest electronic device.

Embodiments of the disclosure also allow for manipulation of the queue in the host electronic device. Illustrating by example, in one or more embodiments a user interface of the host electronic device can receive user input. The one or more processors of the host electronic device can rearrange requests in the queue in response to the user input. In other embodiments, the one or more processors can remove at least one request from the queue in response to the user input.

Guest electronic devices can also send "bump" requests requesting that a request be moved up, down, delayed, or deleted. Illustrating by example, a communication device of a host electronic device can receive a bump request from a first electronic device and can rearrange the queue in response to the bump request.

There are many reasons a guest electronic device may transmit a bump request. If, for example, five guests each request that "Photograph" by Nickelback be played back-to-back to back-to-back to back, Amit may start to see people heading for the exits fearing a tortuous earworm will plague them for months ahead, depriving them of both sleep and sanity. In an effort to save the party for the poor host, who is equally concerned but trying to please his guests, Amit may transmit a bump request asking for "The Summer of '69" to be moved immediately to the top of the queue to become the principal request. Summers certainly do seem to last forever when Photograph is on a looping repeat, after all. Accordingly, in one or more embodiments a bump request may request the presentation of media content, e.g., "The Summer of 69," occur prior to the presentation of other media content, the dreaded "Photograph," output from another application operating locally on another guest electronic device also electronically in communication with the host electronic device.

Bump request can take other forms as well. If Amit needs to use the restroom, and does not want to miss his song, the bump request may indicate that the application operating locally on the guest electronic device will be unavailable to deliver the media content to the host electronic device during a specified duration of time. If Amit plans to leave the party early, perhaps fearing more Nickelback songs, the bump request may indicate that the guest electronic device will be exiting the environment of the host electronic device at a specified time, and so forth. These examples of bump requests are illustrative only. Others will be described below. Still others will be obvious to those of ordinary skill in the art having the benefit of this disclosure.

Advantageously, embodiments of the disclosure provide a system where a host electronic device receives media content from multiple guest electronic devices and allows order of play through, for example, a content presentation companion device to allow all devices operating within an environment of the host electronic device to play music in a certain order. This allows for the attendees of a party to orchestrate the presentation of media content through a single host electronic device. At the same time, the host electronic device need not have the required streaming, playback, or other media content generating applications operating on the host electronic device. Instead, these applications can operate locally on the various guest electronic devices, with only the media content output therefrom being transmitted to the host electronic device. Other advantages will be described below. Still others will be obvious to those of ordinary skill in the art having the benefit of this disclosure.

Turning now to FIG. 1, illustrated therein is one explanatory system 100 configured in accordance with one or more embodiments of the disclosure illustrating an electronic device 101 operating in conjunction with a content presentation companion device 102 in accordance with one or more embodiments of the disclosure. In FIG. 1, the electronic device 101 and the content presentation companion device 102 operate in tandem as a system, with the electronic device 101 providing the processing power to generate and/or receive content that could be presented on the display of the electronic device 101 and/or output from loudspeakers of the electronic device 101, but that is instead redirected for presentation using the content presentation companion device 102. This allows the content presentation companion device 102 to serve as the primary display device and/or the primary audio output for the electronic device 101.

As shown in FIG. 1, the electronic device 101 is electronically in communication with the content presentation companion device 102 using a wireless electrical communication channel 106. When the electronic device 101 is electronically in communication with the content presentation companion device 102, this allows the electronic device 101 to use the larger display 103 of the content presentation companion device 102 to present visible portions of media content and/or the more powerful speakers of the content presentation companion device 102 to present audible portions of the media content.

Illustrating by example, in one or more embodiments the electronic device 101 can operate in a "content redirection" mode by presenting content such as movies, videos, images, and even a traditional computer user interface, that are generated or received by the electronic device 101 and are redirected to the display 103 and/or loudspeakers of the content presentation companion device 102. When, for instance, a gaming application is operating on one or more processors of the electronic device 101, the content redirection mode can allow the electronic device 101 to serve as a gaming controller while characters, scenes, events, and other characteristics of the game are presented on the display 103 of the content presentation companion device 102.

Embodiments of the disclosure contemplate that with the advanced computing power available in smartphones and other electronic devices, users often play games and consume music, movies, videos, television shows, and other content using these devices. Additionally, they can perform work operations such as sending email, managing files, working on documents and spreadsheets, and so forth. By establishing a wireless electrical communication channel 106 between the electronic device 101 and the content presentation companion device 102, the processing power of the electronic device 101 can be leveraged to deliver this content to the content presentation companion device 102 for presentation of that content on the display 103 of the content presentation companion device 102. This allows a user to watch television, listen to music, play video games, work on homework or office work, video call friends and family, or perform other tasks using the one or more processors of the electronic device 101 combined with the large display 103 and/or loudspeakers of the content presentation companion device 102.

Using a content redirection feature, a small electronic device 101 such as the smartphone shown in FIG. 1 can connect to connect to a content presentation companion device 102 such as a larger monitor, television, loudspeakers, or other device having a larger screen or more powerful audio output capabilities. Using the content redirection feature, users can wirelessly stream video, music, gaming application output, or other content from the electronic device 101 to the larger display 103 and/or more powerful loudspeakers of the content presentation companion device 102 with no loss in performance. Resolution of the images 104 on the content presentation companion device 102 can be as high as 4K with frame rates that present the content 105 without flicker or distortion. In the illustrative embodiment of FIG. 1, neither a cable nor a docking station is required to use the content redirection feature since communication occurs across a wireless electrical communication channel 106.

When using the content redirection feature, the electronic device 101 can function as a mouse, trackpad, gaming controller, or other control device while the content 105 is being presented on the content presentation companion device 102. The content redirection feature can be used for presenting games, movies, pictures, videos, television shows, computer desktops, or movies on the larger display 103 and/or loudspeakers of a content presentation companion device 102 while a controller user interface used to control the content is presented locally on the display of the electronic device 101. Additionally, the controller user interface presented on the electronic device 101 can be used to control gaming applications, video conferences, and other content presentation tasks.

Embodiments of the disclosure advantageously provide a more intelligent system that dynamically enhances the feature set offered by the electronic device 101 by causing the electronic device 101 to deliver content to the content presentation companion device 102 while at the same time serving as a controller for the content presentation companion device 102. When a controller user interface is presented on the display of the electronic device 101, a user can deliver user input to the controller user interface to control the content being presented on the content presentation companion device 102. For instance, in one or more embodiments a user interface feature being presented on the content presentation companion device 102 can be adjusted using a controller user interface that is presented on a display of the electronic device 101.

Figure 2:
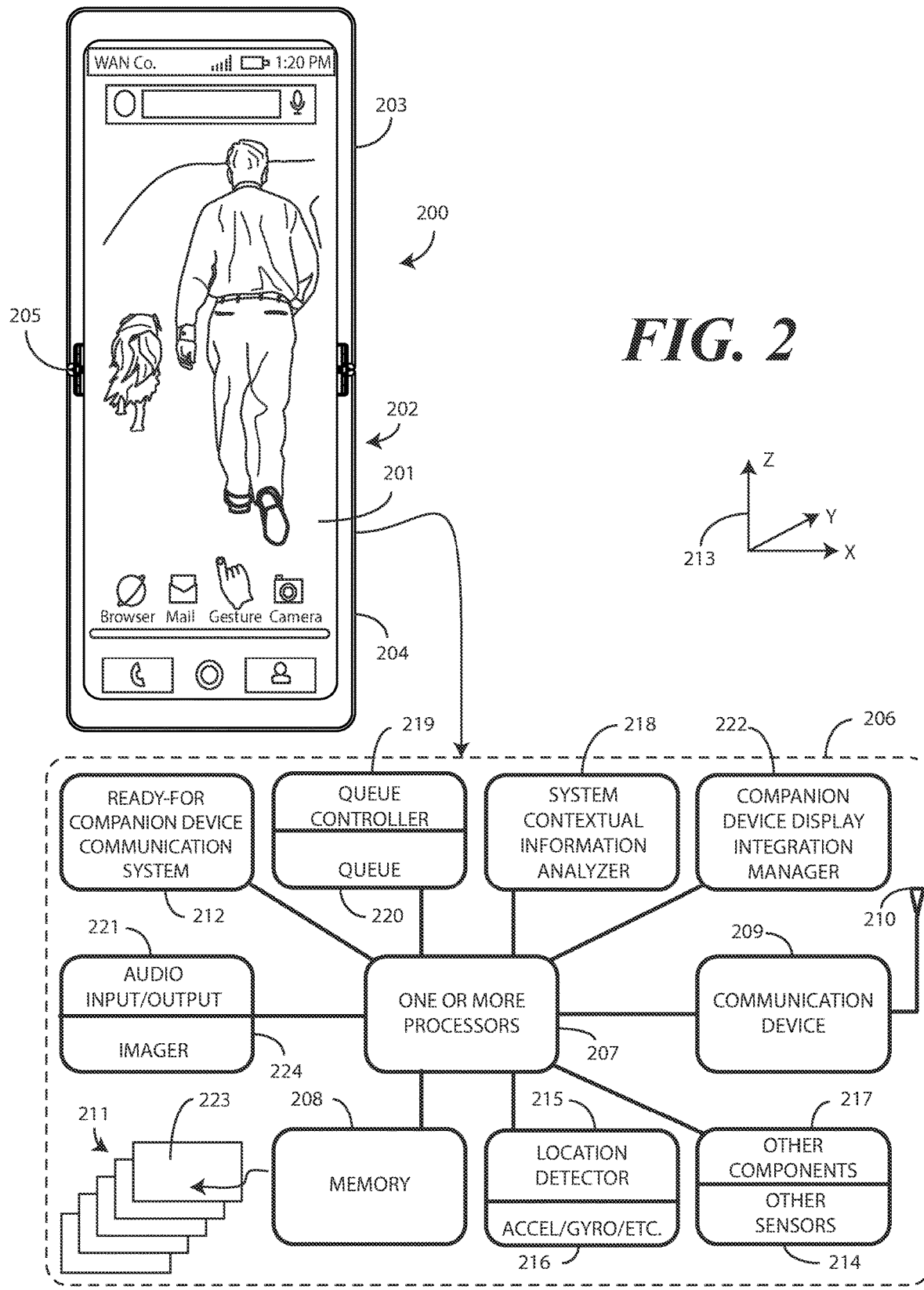
FIG. 2 illustrates one explanatory electronic device in accordance with one or more embodiments of the disclosure.

Before turning to the user interface enhancements and how they operate, a deeper look into the hardware of the electronic device 101 will be provided. Turning now to FIG. 2, illustrated therein is one explanatory electronic device 200 configured in accordance with one or more embodiments of the disclosure.

Illustrated in FIG. 2 is one explanatory electronic device 200 in accordance with one or more embodiments of the disclosure. The electronic device 200 of FIG. 1 is a portable electronic device and is shown as a smartphone for illustrative purposes. However, it should be obvious to those of ordinary skill in the art having the benefit of this disclosure that other electronic devices may be substituted for the explanatory smart phone of FIG. 1. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200.

In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 1 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position.

In other embodiments, such as was the case with the electronic device (101) of FIG. 1, the device housing 202 will be rigid and will include no hinge. In still other embodiments, the device housing 202 will be manufactured from a flexible material such that it can be bent and deformed. Where the device housing 202 is manufactured from a flexible material or where the device housing 202 includes a hinge 205, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by electrical conductors, or a bus disposed along one or more printed circuit boards.

The illustrative block diagram schematic 206 of FIG. 2 includes many different components. Embodiments of the disclosure contemplate that the number and arrangement of such components can change depending on the particular use case or application. Examples of such applications relevant to the methods described below include gaming applications. However, the electronic device 200 can support other applications as well such as content consumption applications. Examples of content consumption applications include video streaming applications, movie streaming applications, image viewing applications, and television show streaming applications. The electronic device 200 can also support user interaction applications, examples of which include productivity applications such as word processors and spreadsheets, and content creation applications. Accordingly, electronic devices configured in accordance with embodiments of the disclosure can include some components that are not shown in FIG. 2, and other components that are shown may not be needed and can therefore be omitted.

In one embodiment, the electronic device 200 includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation. In one or more embodiments, the executable software comprises at least one gaming application 223.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

Various sensors 214 can be operable with the one or more processors 207. One example of a sensor that can be included with the various sensors 214 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 214 is a geo-locator that serves as a location detector 215. In one embodiment, location detector 215 is able to determine location data when authenticating a user. Location can be determined by capturing the location data from a constellation of one or more earth orbiting satellites, or from a network of terrestrial base stations to determine an approximate location. The location detector 215 may also be able to determine location by locating or triangulating terrestrial base stations of a traditional cellular network, or from other local area networks, such as Wi-Fi networks.

Another example of a sensor that can be included with the various sensors 214 is an orientation detector 216 operable to determine an orientation and/or movement of the electronic device 200 in three-dimensional space. Illustrating by example, the orientation detector 216 can include an accelerometer, gyroscopes, or other device to detect device orientation. An accelerometer can be used as a motion detector to detect motion of the electronic device 200 as well. Additionally, the accelerometer can be used to sense some of the gestures of the user, such as one talking with their hands, running, or walking.

The orientation detector 216 can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

In one or more embodiments, the one or more sensors 214 comprise an image capture device 224. In one embodiment, the image capture device 224 comprises a two-dimensional imager configured to receive at least one image of a person within an environment 213 of the electronic device 200. In one embodiment, the image capture device 224 comprises a two-dimensional red-green-blue (RGB) imager. In another embodiment, the image capture device 224 comprises an infrared imager. Other types of imagers suitable for use as the image capture device 224 will be obvious to those of ordinary skill in the art having the benefit of this disclosure.

In one or more embodiments, the block diagram schematic 206 includes an audio input/processor 221. The audio input/processor 221 is operable to receive audio input from an environment 213 about the electronic device 200. The audio input/processor 221 can include hardware, executable code, and speech monitor executable code in one embodiment. The audio input/processor 221 can be operable with one or more predefined identification references stored in memory 208.

With reference to audio input, the predefined identification references can comprise representations of basic speech models, representations of trained speech models, or other representations of predefined audio sequences that are used by the audio input/processor 221 to receive and identify voice commands that are received with audio input captured by an audio capture device. In one embodiment, the audio input/processor 221 can include a voice recognition engine. Regardless of the specific implementation utilized in the various embodiments, the audio input/processor 221 can access various speech models stored with the predefined identification references to identify speech commands, languages being spoken, and other information.

The one or more processors 207 can perform filtering operations on audio input received by the audio input/processor 221. For example, in one embodiment the one or more processors 207 can filter the audio input into identifiable audio input, i.e., first audio input, and other audio input that is not identifiable, i.e., second audio input.

The electronic device 200 can include a system contextual information analyzer 218. The system contextual information analyzer 218 can include a face analyzer and an environmental analyzer. The face analyzer and/or environmental analyzer can be configured to process an image or depth scan of an object and determine whether the object matches predetermined criteria by comparing the image or depth scan to one or more predefined identification references stored in memory 208.

For example, the face analyzer and/or environmental analyzer can operate as an identification module configured with optical and/or spatial recognition to identify objects using image recognition, character recognition, visual recognition, facial recognition, color recognition, shape recognition, and the like. Advantageously, the face analyzer and/or environmental analyzer can be used as a facial recognition device to determine the identity of one or more persons detected within the environment 213 of the electronic device 200.

Other components 217 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 217 can also include proximity sensors. The proximity sensors fall in to one of two camps: active proximity sensors and "passive" proximity sensors. Either the proximity detector components or the proximity sensor components can be generally used for gesture control and other user interface protocols.

The other components 217 can optionally include a barometer operable to sense changes in air pressure due to elevation changes or differing pressures of the electronic device 200. The other components 217 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

The system contextual information analyzer 218 can include a context engine operable with the various sensors to detect, infer, capture, and otherwise determine persons and actions that are occurring in an environment 213 about the electronic device 200. For example, where included one embodiment of the context engine determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine in detecting multi-modal social cues, emotional states, moods, and other contextual information. The context engine can comprise an artificial neural network or other similar technology in one or more embodiments.

A content presentation companion device communication system 212 can allow for electronic communication with other electronic devices. As noted above, some modern portable electronic devices are equipped with a content redirection feature. The content presentation companion device communication system 212 enables such a content redirection feature to occur.

Using smartphones manufactured by Motorola Mobility™ as one illustrative example, some models are equipped with their Ready For™ as their content presentation companion device communication system 212, which is a feature that allows the Ready For™ device to connect to a content presentation companion device such as a larger monitor, television, loudspeakers, or other device having a larger screen, more powerful speakers, or other enhanced feature set. Using the Ready For™ feature, users can wirelessly stream video and/or audio content to the larger display or more powerful speakers of a content presentation companion device with no loss in performance. Illustrating by example, resolution of the images on the content presentation companion device is up to 4K with a frame rate that presents content without flicker or distortion.

While the Ready For™ feature does not require a cable or a docking station, many electronic devices do require a physical connection between the electronic device and the content presentation companion device for a content redirection feature to work properly. To wit, many standards such as the highly popular and ubiquitous high-definition multimedia interface (HDMI) interface standard require a physical wire be connected between a source device and a display device for content redirection to work. Additionally, even some users of advanced content redirection technologies such as Ready For™ even prefer to use a docking station and/or physical cable to couple their electronic device to a content presentation companion device because a physical cable defining a display data channel invariably offers a more reliable and faster data connection than do most wireless connections. Indeed, coupling a smartphone having Ready For™ capability to a monitor having a defined display size is a quite popular way to view content on a larger display.

Such is not the case, however, for group settings such as business meetings, parties, banquets, award ceremonies, and even classroom settings. In such group settings, the host in charge of operating a content presentation companion device will generally prefer wireless electrical communication channels for communication between their smartphone, for example, and a larger monitor or more powerful loudspeakers. This is true because the smartphone, where the media content is being generated or streamed, is frequently carried around the venue by the host. When a wire is connected between the smartphone and the content presentation companion device, this limits a user's motion and agility. This is especially true when the uncontrollable urge to express themselves via the art of dance arises when the artistic stylings of Bryan Adams fill the room. Thus, while wireless connections are preferred, in most embodiments of the disclosure the electronic communication between a content presentation companion device and the electronic device 200 will be wireless.

In one or more embodiments, the content presentation companion device communication system 212 is operable with the one or more processors 207. In some embodiments, the one or more processors 207 can control the content presentation companion device communication system 212. In other embodiments, the content presentation companion device communication system 212 can operate independently, delivering information gleaned from detecting multi-modal social cues, emotional states, moods, and other contextual information to the one or more processors 207. The content presentation companion device communication system 212 can receive data from the various sensors 214. In one or more embodiments, the one or more processors 207 are configured to perform the operations of the content presentation companion device communication system 212.

In one or more embodiments, working with the other components the content presentation companion device communication system 212 can establish electronic communication with one or more guest electronic devices. Illustrating by example, the content presentation companion device communication system 212 can establish, using the communication device 209 of the electronic device 200, electronic communication with at least a first guest electronic device and a second guest electronic device.

When this occurs, in one or more embodiments the content presentation companion device communication system 212 can receive a first request requesting presentation of media content output from an application operating locally on the first guest electronic device and a second request requesting presentation of other media content output from another application operating locally on the second guest electronic device from the second guest electronic device. The content presentation companion device communication system 212 can then arrange the first request and the second request in a queue 220.

A queue controller 219 can then manage requests stored within the queue 220. The queue controller 219 can also present the queue 220 on a user interface, one example of which is the display 201.

The queue controller 219 can manage the queue 220 in a variety of ways. Illustrating by example, when a user interface such as the display 201 receives user input, in one or more embodiments the queue controller 219 can rearrange requests in the queue 220 in response to that user input. In other embodiments, the queue controller 219 can remove at least one request from the queue 220 in response to the user input.

When bump requests are received from guest electronic devices, the queue controller 219 can take various actions. If a bump request requests the presentation of media content occur prior to the presentation of other media content output from other application operating locally on other guest electronic devices, the queue controller 219 may move a particular request up in priority. Similarly, if the bump request indicates that a guest electronic device making a particular request will be exiting the environment of the electronic device 200 at a specified time, the queue controller 219 may move the request up in priority to make sure the request becomes the principal request before the guest electronic device making the request leaves the environment, and so forth.

The opposite action can occur when the bump request requests a decrease in priority. Illustrating by example, of a bump request indicates that a guest electronic device making the request will be unavailable to deliver media content to the electronic device 200 during a specified duration if time, the queue controller 219 may move the request downward in priority to as to ensure the request becomes a principal request when the guest electronic device making the request is able to deliver the media content.

If a cease request is received from a guest electronic device making a request, the queue controller 219 may remove the request from the queue 220. Similarly, if a user of the electronic device 200 wants to remove a request for Photograph by Nickelback, they may deliver user input to the display 201 indicating this desire. The queue controller 219 may remove the request from the queue 220 in response to this user input, and so forth. Thus, in one or more embodiments the queue controller 219 may rearrange entries of the queue 220 in response to bump requests, user input received at a user interface like the display 201, or combinations thereof.

In one or more embodiments, to save power on one or both of the electronic device 200 or other electronic devices with which electronic communication is established, the content presentation companion device communication system 212 disconnects, using the communication device 209, the electronic communication between other electronic devices between receiving requests stored in the queue 220 and the queue controller 219 selecting those requests when they become principal requests. In one or more embodiments, the electronic communication comprises a single-instance personal identification number (PIN) communication that is enabled only when requests or media content from other electronic devices is received.

The information stored in the queue 220 can vary. When, for example, one or more guest electronic devices are in communication with the content presentation companion device communication system 212 using the communication device 209, the queue 220 can identify an order of requests received from guest electronic devices from which the requests are received. The queue 220 can also identify a media content type of requested media content found in the requests. The queue 220 can further identify an application operating locally on the guest electronic device making the request as well. The media content identified in the queue 220 can include webcam content, streaming content, audio content, video content, multimedia content, and so forth.

In one or more embodiments, to allow the electronic devices in communication with the electronic device 200 using the content presentation companion device communication system 212 to communicate with each other, the content presentation companion device communication system 212 can cause the communication device 209 to transmit an identification of each electronic device to each other electronic device. Illustrating by example, if the content presentation companion device communication system 212 is in communication with a first guest electronic device and a second guest electronic device, the content presentation companion device communication system 212 can cause the communication device 209 to transmit an identification of the first guest electronic device to the second guest electronic device enabling the second guest electronic device to establish electronic communication with the first guest electronic device, and so forth.

In one or more embodiments, the content presentation companion device communication system 212 can query other electronic devices to determine what applications operating locally on those electronic devices are capable of delivering media content to the electronic device 200. In one or more embodiments, such a query occurs when the communication device 209 detects electrical communication with the other electronic devices across a wireless electrical communication channel. In one or more embodiments, the query occurs when both the communication device 209 detects electrical communication with the other electronic devices across the wireless electrical communication channel and at least one application operating locally on another electronic device makes a request for the presentation of media content.

The inclusion of the content presentation companion device communication system 212 advantageously allows the queue controller 219 to arrange request for presentation of media content from applications operating locally on one or more guest electronic devices received by the communication device 209 in a queue 220. When the queue controller 219 selects a principal request, the content presentation companion device communication system 212 can cause the communication device 209 to initiate an application identified by the principal request, thereby causing the media content identified in the principal request to be delivered to the communication device 209.

A content presentation companion device integration manager 222 is operable to perform content redirection operations. In one or more embodiments, the content presentation companion device integration manager 222 allows the one or more processors 207 of the electronic device 200 to connect to a content presentation companion device such as a larger monitor, television, loudspeakers, or other device having a larger screen or more powerful audio output capabilities. The content presentation companion device integration manager 222 then facilitates wireless streaming of content to the larger display or more powerful audio output of a content presentation companion device.

The inclusion of the content presentation companion device integration manager 222 allows the electronic device 200 to be used as queue controller 219 user interface, mouse, trackpad, or other control device while content is being presented on the content presentation companion device. The content presentation companion device integration manager 222 can be used for presenting pictures, videos, television shows, music, webcam feeds, or movies via the content presentation companion device. Additionally, the content presentation companion device integration manager 222 can facilitate gaming, video conferences, and other content presentation tasks using the display of a content presentation companion device as well.

It is to be understood that FIG. 2 is provided for illustrative purposes only and for illustrating components of one electronic device 200 in accordance with embodiments of the disclosure and is not intended to be a complete schematic diagram of the various components required for an electronic device. Therefore, other electronic devices configured in accordance with embodiments of the disclosure may include various other components not shown in FIG. 2 or may include a combination of two or more components or a division of a particular component into two or more separate components, and still be within the scope of the present disclosure.

Figure 3:
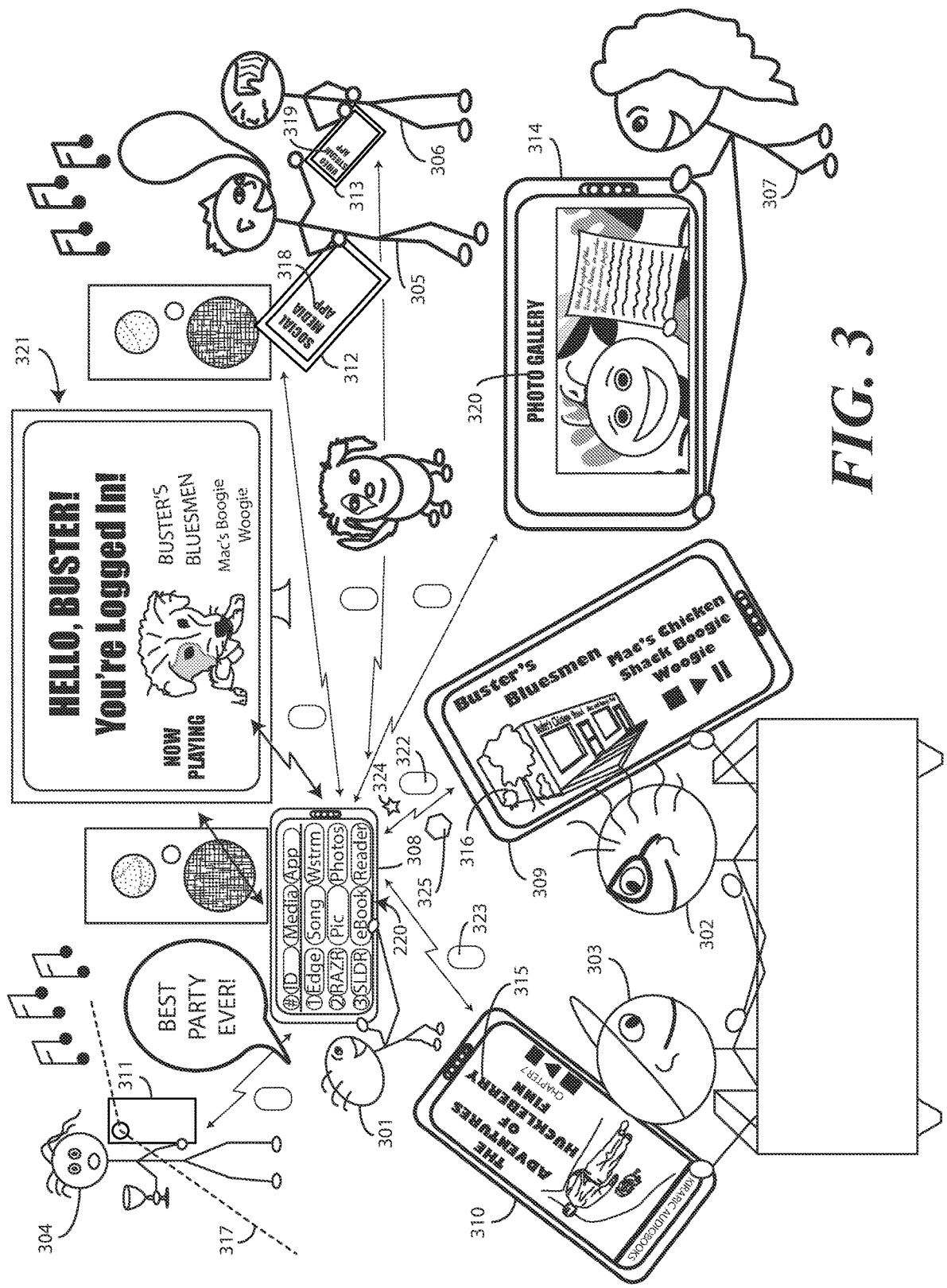
FIG. 3 illustrates one explanatory system in accordance with one or more embodiments of the disclosure operating in a group setting.

Turning now to FIG. 3, illustrated therein is one explanatory system in accordance with one or more embodiments of the disclosure. The scene is a huge party, with a host 301 and several guests 302, 303, 304, 305, 306, 307. The host 301 has a host electronic device 308, while each guest 302, 303, 304, 305, 306, 307 has a guest electronic device 309, 310, 311, 312, 313, 314. Each guest electronic device 309, 310, 311, 312, 313, 314 has an application operating locally on its respective guest electronic device 309, 310, 311, 312, 313, 314 that can output media content 315, 316, 317, 318, 319, 320.

In this illustrative embodiment, guest electronic device 309 has a music streaming application that is outputting media content 316 in the form of a song, and in particular, the infamous Mac's Chicken Shack Boogie Woogie by Buster and his legendary Bluesmen (feat. Henry). By contrast, the application operating on guest electronic device 310 is an audiobook application generating media content 315 in the form of a reading of the Adventures of Huckleberry Finn by Will Wheaton.

Guest 304 is operating a webcam application to capture all the gaiety of the party. Accordingly, the media content 317 generated by the application operating locally on guest electronic device 311 comprises webcam content.

Guest 305 has a social media application operating on his guest electronic device 312. Accordingly, the media content 318 being generated comprises social media content. Guest 306 has a video streaming application operating locally on his guest electronic device 313 outputting media content 319 in the form of streaming video. Guest 307 has a photo gallery application outputting media content 320 in the form of pictures on her guest electronic device 314. These examples of media content are illustrative only, as other forms of media content output by application operating locally on a guest electronic device will be obvious to those of ordinary skill in the art having the benefit of this disclosure.

Each guest 302, 303, 304, 305, 306, 307 wants each other guest 302, 303, 304, 305, 306, 307 to be impressed by the rarefied intelligence and taste embodied in their media content selection that they wish to share. Specifically, each guest 302, 303, 304, 305, 306, 307 wants the host 301 to cause a content presentation companion device 321 in communication with the host electronic device 308 to deliver their media content 315, 316, 317, 318, 319, 320 to the party so that both the guests 302, 303, 304, 305, 306, 307 and the host 301 can hear their particular request. Illustrating by example, guest 303 is just waiting to stand and yell, "Yes, Mark Twain ROCKS!" when chapter 7 of The Adventures of Huckleberry Finn emanates from the loudspeakers of the content presentation companion device 321.

To enable this magic to happen, in one or more embodiments a communication device of the host electronic device 308 establishes electronic communication with each guest electronic device 309, 310, 311, 312, 313, 314. Illustrating by example, the communication device establishes electronic communication with at least a first guest electronic device, e.g., guest electronic device 309, and a second guest electronic device, e.g., guest electronic device 310.

Detection of host electronic device 308 and guest electronic devices 309, 310, 311, 312, 313, 314 can occur in a variety of ways. In one or more embodiments, each guest electronic device 309, 310, 311, 312, 313, 314 identifies, using one or more processors of the guest electronic device 309, 310, 311, 312, 313, 314, a host electronic device 308 operating within an environment of the guest electronic devices 309, 310, 311, 312, 313, 314. For instance, one or more sensors of a given guest electronic device may identify that the host electronic device 308 is operating within the environment of the guest electronic device when a location detector of the guest electronic device identifies a location matching a calendar event received from the host electronic device and stored in a calendaring application operating locally on the guest electronic device. Thus, if guest electronic device 309 had received an invitation to this particular party the week prior, with that invitation including the location of the party and being stored in a calendaring application operating in guest electronic device 309, when guest 302 arrives to the party the location detector of guest electronic device 309 may determine that the location matches the invite and, therefore, since the invitation came from the host electronic device 308 the host electronic device 308 must be operating within the environment of the guest electronic device 309. Accordingly, one or more processors operable with the location detector may identify the host electronic device 308 operating within the environment of the guest electronic device 309 in response to one or more signals from the location detector, with the communication device of the guest electronic device 309 or the communication device of the host electronic device 308 then establishing electronic communication with the other electronic device in response to this identification. Other techniques for identifying a guest electronic device operating within an environment of a host electronic device, or vice versa, will be obvious to those of ordinary skill in the art having the benefit of this disclosure.

In one or more embodiments, in addition to establishing electronic communication with the host electronic device 308, each guest electronic device 309,310,311,312,313,314 can establish electronic communication with the other guest electronic devices 309,310,311,312,313,314 as well. This allows guest electronic devices to communicate privately with another guest electronic device or group of guest electronic devices. Indeed, in some embodiments the host electronic device 308 is able to show the guest electronic devices 309,310,311,312,313,314 the other guest electronic devices 309,310,311,312,313,314 that are connected to it and/or the environment for communication between each other as opposed to communication solely to and from the guest electronic devices 309,310,311,312,313,314 to the host electronic device 308.

In such a use case, when many guest electronic devices 309,310,311,312,313,314 are in an environment like a banquet hall or classroom, some of the guest electronic devices 309,310,311,312,313,314 may want to communicate directly with another guest electronic device at another table or for splitting up into groups for group work. Without this functionality, the guest electronic devices 309,310,311,312, 313,314 would not be able to see other guest electronic devices 309,310,311,312,313,314 to communicate with.

However, this feature now facilitates discovery of other devices and communication of media content, webcam content, etc.

This establishment of the electronic communication with each guest electronic device 309,310,311,312,313,314 can continue as the host electronic device 308 identifies each guest electronic device 309,310,311,312,313,314 operating within the environment of this particular social affair.

In one or more embodiments, the electronic communication occurring between the host electronic device 308 and each guest electronic device 309,310,311,312,313,314 comprises a single-instance PIN communication. This allows for credential sharing to establish the electronic communication when the host electronic device 308 and the guest electronic devices 309,310,311,312,313,314 identify each other. Additionally, in one or more embodiments a media content sharing feature set can be unlocked when electronic communication is established between a host electronic device 308 and the guest electronic devices 309,310,311,312,313, 314. Illustrating by example, in one or more embodiments a media content sharing feature set associated with an application operating locally on each guest electronic device 309,310,311,312,313,314 is unlocked in response to establishment of electronic communication with the host electronic device 308.

Once electronic communication is established, each guest electronic device 309,310,311,312,313,314 can transmit a request for presentation of media content output from an application operating locally on the respective guest electronic device to the host electronic device 308. In one or more embodiments, each request can indicate a time slice of a predefined even occurring in the environment of the guest electronic devices 309,310,311,312,313,314 and the host electronic device 308 during which the media content should be transmitted to the host electronic device 308. In this illustration, the time slice during the predefined event would be a time window, e.g., from 1:04 AM to 1:06 AM, during the party where a particular media content presentation is being requested.

Accordingly, in one or more embodiments when each guest electronic device 309,310,311,312,313,314 established electronic communication with the host electronic device 308, a communication device of the guest electronic device 309,310,311,312,313,314 delivers a request requesting presentation by the host electronic device 308 of media content output from an application operating locally on the respective guest electronic device 309,310,311,312,313,314. In one or more embodiments, one or more processors of the guest electronic device 309,310,311,312,313,314 can prompt, on a user interface such as a display, for a selection of the application operating locally on the guest electronic device 309,310,311,312,313,314 in response to identifying the host electronic device 308 operating within the environment of the guest electronic device 309,310,311,312,313, 314. The prompt may say, "Would you like to request a song using the Halentecks Music Streaming Application?" When a user delivers user input to the user interface of the guest electronic device, the one or more processors of the guest electronic device may cause an identification of the application operating locally on the guest electronic device to be included with the request.

Illustrating by example, a communication device of the host electronic device 308 can receive a first request 322 requesting presentation of media content 316 output from an application operating locally on a first guest electronic device 309 from the first guest electronic device 309, a second request 323 requesting presentation of other media content 315 output from another application operating locally on the second guest electronic device 310 from the second guest electronic device 310, and so forth. In one or more embodiments where the electronic communication between the host electronic device 308 and the one or more guest electronic devices 309,310,311,312,313,314 comprises a single-instance PIN communication, the electronic communication is enabled only when the requests for media content from guest electronic devices are received.

In one or more embodiments, as the requests 322,323 are received, one or more processors of the host electronic device 308 arrange the requests in a queue 220. In this illustrative embodiment, the one or more processors of the host electronic device 308 present the queue 220 on a user interface of the host electronic device 308 as shown.

It is important to note that in accordance with one or more embodiments the host electronic device 308 need not have the application operating locally on the guest electronic device making a request to be able to present the content output by the application operating locally on the guest electronic device making the request or, alternatively, deliver the media content to the content presentation companion device 321. Illustrating by example, the host electronic device need not have the Wstrm application listed in the principal request of the queue 220 that is operating locally on the Edge phone. Similarly, the host electronic device 308 need not have the photos application operating locally on the RAZR phone as shown in the second request of the queue 220 or the Reader application operating locally on the SLDR phone listed in the third request of the queue 220. This is true because the media content set forth in these requests of the queue 220 is output from the application operating locally on each guest device, with only the media content being transmitted to the host electronic device 308. Accordingly, guest 302 can log into the music player application operating on guest electronic device 309 with private credentials, with only the soothing sounds (in electronic signal form) of Buster's Bluesmen getting down and dirty with Mac's Chicken Shack Boogie Woogie being transmitted out of the music player application operating locally on the guest electronic device 309 being transmitted to the host electronic device 308.

In this illustrative embodiment, the queue 220 identifies an order of requests received from the guest electronic devices 309,310,311,312,313,314 in a first column. The queue 220 also identifies a device type of the guest electronic devices 309,310,311,312,313,314 in a second column. The media content type is identified in a third column of the queue 220, while the application operating locally on each guest electronic device generating the media content is identified in a fourth column of the queue 220. This particular queue 220 is illustrative only, as others, optionally identifying other information, will be obvious to those of ordinary skill in the art having the benefit of this disclosure.

Embodiments of the disclosure contemplate that the host 301 can manipulate the queue 220 as he sees fit. After all, adapting Lesley Gore, it's his party and he'll manipulate if he wants to do so. The host 301 can do this in a variety of ways.

In the simplest example, the host 301 can deliver user input to the user interface of the host electronic device 308 to move requests up, move requests down, add requests, delete requests, and so forth. Illustrating by example, the host 301 can deliver user input to a user interface of the host electronic device 308. In one or more embodiments, the one or more processors of the host electronic device 308 then rearrange the queue 220 in response to the user input. The one or more processors may move a particular request up in response to the user input, move a particular request down in response to the user input, delete a particular request in response to the user input, or even add a new request in response to the user input. Accordingly, in one or more embodiments the host can deliver user input to a user interface of the host electronic device 308. One or more processors of the host electronic device 308 can then rearrange, add, and/or remove requests from the queue 220 in response to the user input.

In one or more embodiments, a memory of the host electronic device 308 can store an event agenda. In one or more embodiments, the one or more processors of the host electronic device 308 can rearrange the queue 220 as a function of the event agenda. Illustrating by example, if guest 304 has secretly negotiated with the host 301 to capture special events at the party, the event agenda stored in the memory of the host electronic device 308 may indicate that guest 306 will be recognized for a very prestigious award promptly at 9:52 PM. Accordingly, the request from guest electronic device 311 to share the webcam content as media content 317 with other guests in attendance may be arranged to become the principal request right at 9:52 PM in accordance with the event agenda, and so forth. The host electronic device 308 can then deliver this media content 317 to the content presentation companion device 321 for presentation to the environment within which the host electronic device 308 and the plurality of guest electronic devices 309,310,311,312,313,314 are situated, such as by presenting the media content 317 on the large monitor for all to see the tears of joy running down the face of guest 306 when receiving this very prestigious award.

In one or more embodiments, the guests 302,303,304,305, 306,307 can also attempt to manipulate the queue 220 as well. As previously described, the guest electronic devices 309,310,311,312,313,314 can transmit bump requests requesting the priority of their requests be changed and/or that their requests be deleted. In one or more embodiments, a user interface of a guest electronic device receives user input. In response to that user input, the communication device of the guest electronic device then transmits a bump request to the host electronic device 308 in response to the user input.

Illustrating by example, guest 302, seeing that guest 303 is attempting to turn the party into a real bummer by changing the rocking music to a Will Wheaton reading of Huckleberry Finn, which while once a classic is now a bit controversial, may want to keep the energy moving since he knows that everyone absolutely adores Buster and his Bluesmen playing Mac's Chicken Shack Boogie Woogie. Nothing makes a party come to life like Buster. Accordingly, in an attempt to help the host 301 retain guests at the party, guest 302 may deliver user input to the user interface of his guest electronic device 309, thereby causing the communication device of his guest electronic device 309 to transmit a bump request 324 to the host electronic device 308.

In one or more embodiments, the bump request 324 requests the presentation of media content 316 occur prior to presentation of other media content 315 output from another application operating locally on another guest electronic device 310 that also is in electronic communication with the host electronic device 308. Such is the case here. However, the bump request 324 can take other forms as well.

Illustrating by example, in other embodiments, the bump request 324 can indicate that the guest electronic device 309 will be exiting the environment of the host electronic device 308 at a specified time. If, for example, guest 302 plans to leave in the next fifteen minutes, this might be indicated in the bump request 324.

In other embodiments, the bump request 324 may indicate that the application operating locally on the guest electronic device 309 will be unavailable to deliver the media content 316 to the host electronic device 308 during a specified duration of time. This might be the case, for example, if guest 302 decides to go for a smoke break outside. In one or more embodiments, the one or more processors of the host electronic device 308 rearrange the queue 220 in response to the bump request 324. If a guest wants to remove a request from the queue 220, in one or more embodiments they deliver user input to a user interface of their guest electronic device, thereby causing the communication device of the guest electronic device to transmit a cease request to the host electronic device 308 removing the request from the queue 220 stored in the host electronic device 308 in response to the user input, and so forth.

Just as the queue 220 can be rearranged in accordance with an event agenda stored within the host electronic device 308, requests from guest electronic devices can be transmitted in response to particular triggers. In one or more embodiments, delivery of a request requesting presentation of media content output form an application operating locally on a guest electronic device is triggered by a predefined event.

Recall from above the illustrative example of guest 306 receiving a very prestigious award. In one or more embodiments of such an example, the predefined event triggering a request can comprise one or more sensors of guest electronic device 313 detecting and audible announcement of the name of guest 306, who is the owner of guest electronic device 313, being announced. In one or more embodiments, this can trigger a request for media content in the form of selfie webcam content being requested for presentation by the host electronic device 308 or the content presentation companion device 321 in communication with the host electronic device 308 so that everyone can see the tears of joy emanating from the eyes of guest 306. Accordingly, in this illustration the application operating locally on guest electronic device 313 would be a webcam operation and the media content of the request would comprise depictions of the owner of guest electronic device 313 receiving his very prestigious award.

In this illustrative embodiment, guest 302 fears that guest 303 may indeed be successful in having his request 323 become the principal request, thereby causing Will Wheaton to begin reading chapter seven of The Adventures of Huckleberry Finn. Accordingly, guest 302 plans to leave the party. However, he really wants to hear is favorite song before he goes. Accordingly, in such an illustrative situation his bump request 324 constitutes a queueing interaction indicating that guest electronic device 309 will be exiting the environment in which both guest electronic device 309 and the host electronic device 308 are operating within a predetermined time frame. This queueing interaction also requests to play a favorite song of the owner of guest electronic device 309, here guest 302, to the environment of the guest electronic device 309 and the host electronic device 308 before the predetermined time frame elapses.

In this illustrative embodiment, bump request 324 worked, as the request 322 transmitted to the host electronic device 308 from guest electronic device 309 has now been moved to the top of the queue 220, thereby becoming the principal request. In one or more embodiments, when this occurs one or more processors of the host electronic device 308 initiate the application operating locally on guest electronic device 309, thereby causing the application operating locally on guest electronic device 309 to deliver the media content 316 to the host electronic device 308.

In one or more embodiments, one or more processors of host electronic device 308 select a principal request from the queue 220 and then initiate the application operating locally on guest electronic device 309, thereby causing the communication device of the host electronic device 308 to receive the media content 316. In one or more embodiments, guest electronic device 309 receives an initiation command 325 form the host electronic device 308 initiating the application operating locally on the guest electronic device 309, thereby causing the communication device of the guest electronic device 309 to transmit the media content 316 to the host electronic device 308 for presentation by the host electronic device 308, either locally or via the content presentation companion device 321 in communication with the host electronic device 308.

When this occurs, in one or more embodiments the one or more processors initiate the application operating locally on the guest electronic device 309 identified by the principal request, thereby causing the communication device of the host electronic device 308 to receive the media content 316. As shown, Mac's Chicken Shack Boogie Woogie is therefore delivered to the content presentation companion device 321 for presentation to the party. Accordingly, in one or more embodiments the one or more processors of the host electronic device 308 initiate the application operating locally on the first guest electronic device 309 when the principal request is the first request 322. By contrast, had the principal request been the second request 323 from the second guest electronic device 310, the one or more processors of the host electronic device 308 would have initiated the application operating locally on the second guest electronic device 310, thereby causing the communication device of the host electronic device 308 to receive the second media content 315, and so forth.

The illustration of this party provides a perfect platform to see how various embodiments of the disclosure function in a lively and amusing use case. A host electronic device 308 receives, by a communication device of the host electronic device 308, requests for presentation of media content generated by applications operating locally on a plurality of guest electronic devices 309,310,311,312,313,314 to an environment in which both the host electronic device 308 and the plurality of guest electronic devices 309,310,311, 312,313,314 are situated. One or more processors of the host electronic device 308 arrange the requests in a queue 220 in accordance with a prioritization. The one or more processors select a principal request from the queue 220 and cause an application identified by the principal request to generate the media content 316 locally on a guest electronic device 309 identified in the principal request. The communication device of the host electronic device 308 receives the media content 316 from the application identified by the principal request and the one or more processors of the host electronic device 308 cause presentation of the media content 316, either locally or via a content presentation companion device 321.

From the perspective of the guest electronic device 309, the guest electronic device 309 transmits one or more requests, e.g., request 322, for presentation, by a host electronic device 308, of one or more media content 316 offerings generated by one or more applications operating locally on the guest electronic device 309 to an environment in which both the host electronic device 308 and the guest electronic device 309 are situated. Thereafter, in this example, the communication device of the guest electronic device 309 transmits a queueing interaction in the form of a bump request 324 that caused the requests to be rearranged in the queue 220 of the host electronic device 308. The communication device of the guest electronic device 309 then received when its request 322 became the principal request in the queue 220 of the host electronic device 308, an initiation command 325 from the host electronic device 308 causing an application operating locally on the guest electronic device 309 that was identified by the principal request to generate media content 316 identified by the principal request. The communication device of the guest electronic device 309 then transmitted the media content 316 from the application operating locally on the guest electronic device 309 that was identified by the principal request to the host electronic device 308, thereby causing the host electronic device 308 to present the media content 316 to the environment in which both the host electronic device 308 and the guest electronic device 309 are situated.

While a party is one example of an environment in which embodiments of the disclosure can operate, embodiments are not so limited. Embodiments of the disclosure contemplate that the system of FIG. 3 could also be used in a classroom setting. Once students completed their homework assignments, rather than turning in paper to the teacher they may point their electronic devices, which would be guest electronic devices, toward their papers while a webcam application is operational. The teacher's electronic device, operating as the host electronic device, could then manage requests for presentation of schoolwork assignments on an overhead projector operating as a content presentation companion device with the host electronic device as previously described.

Embodiments of the disclosure provide for a host electronic device that receives time slice requests for a specific media/service to be activated on the guest electronic device by the host electronic device. In one or more embodiments, the host electronic device actively starts a service, e.g., an application streaming for audio/video/display or even webcam on a connected guest electronic device when a specific guest electronic device's chance/order comes about in an agenda.

In one or more embodiments, the media content being shared from guest electronic device to host electronic device allows for application login/subscription credentials to be entered into the application operating locally on the guest electronic device locally. Advantageously, this avoids a host needing a subscription to any media content generation/rendering services.

Just to provide other examples of use cases where embodiments of the disclosure would work wonderfully, in one or more embodiments a screen sharing media content arrangement could be used in corporate setup or school setup where each user doesn't have to go to the front of the room and manually connect to a projector or a display. This can also be useful in a school setting where students can "show their work" to the classroom, as previously mentioned. As described in the party example, the host device can manage order, prioritization, addition and deletion of the services to be managed from different connected guest devices. What's more, the connection between host and a client could be based on a temporary connection with single-instance PIN pairing which enabled only a limited service desired.

From the guest electronic device perspective, guest electronic devices can initiate an automatic connection to the network upon which the host electronic device is operating, with the login credentials, e.g., SSID/password encrypted from RSVP, enabling host device as soon as a legit guest device reaches the host location. The services can be expanded to initiate a time slice request for a music playback, video playback, display sharing, webcam sharing to the host device. The guest device can request an upgrade with a prepone request in case where guest is about to leave the host's location and his order is late, e.g., the guest may want to get his favorite song played "The Summer of 69" as he would be leaving in next ten minutes.

In one or more embodiments, the guest device can request an upgrade with a postpone request in case where guest is unavailable when his chance would come. Illustrating by example, a guest may want to delay his presentation as he has to step out for a side discussion with one of the other guests or take another call. Some of these services can be initiated based on a context, e.g. at an award function the moment a particular guest names is announced, the webcam service for that particular guest is initiated so that the guest can remain seated at his place and speak a few words to the whole crowd as his webcam feed is streamed to the host device and host device is connected to the big projector in the banquet hall.

Figure 4:
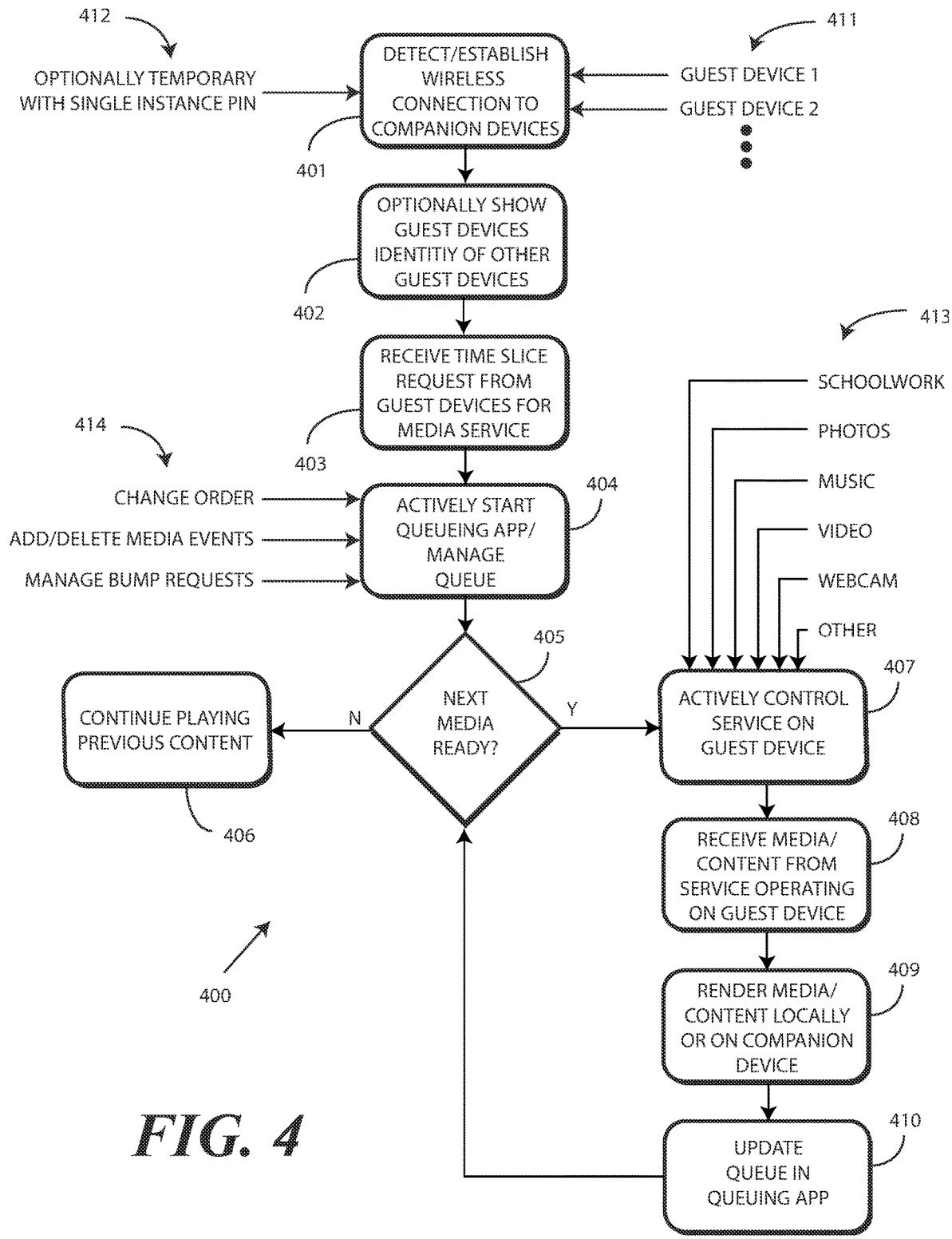
FIG. 4 illustrates one explanatory method in accordance with one or more embodiments of the disclosure.

Turning now to FIG. 4, illustrated therein is one explanatory method 400 in a host electronic device in accordance with one or more embodiments of the disclosure. While the method 400 was described above with reference to a use case in FIG. 3, in the interest of completeness the method 400 is set forth in flowchart form in FIG. 4.

Beginning at step 401, the method 400 establishes, with a communication device of the host electronic device, electronic communication with a one or more guest electronic devices 411. Illustrating by example, step 401 can comprise the communication device establishing electronic communication with at least a first guest electronic device and a second guest electronic device. In one or more embodiments, the electronic communication established at step 401 comprises a single-instance PIN communication 412 that is enabled only when requests, received below at step 403, or media content, received below at step 408, are received from guest electronic devices are received. Said differently, in one or more embodiments the method 400 can disconnect the electronic communication with the first guest electronic device or the second guest electronic device between receiving a request at step 403 and selecting a request via decision 405.

At step 402, the host electronic device can optionally transmit, with the communication device of the host electronic device, an identification of guest electronic devices to other guest electronic devices. Illustrating by example, in one or more embodiments step 402 comprises transmitting an identification of the first guest electronic device to the second guest electronic device, or vice versa, enabling the receiving guest electronic device to establish other electronic communication with the other guest electronic device. This allows guest electronic devices to establish private communication with each other rather than through the host electronic device.

At step 403, the method 400 receives a request indicating a time slice of a predefined event occurring in the environment of the guest electronic devices 411 during which media content should be transmitted from a guest electronic device to the host electronic device. Illustrating by example, in one or more embodiments step 403 comprises receiving, with the communication device of the host electronic device, a first request requesting presentation of media content output from an application operating locally on the first guest electronic device and a second request requesting presentation of other media content output from another application operating locally on the second guest electronic device from the second guest electronic device. This step 403 can be repeated as requests are received from the guest electronic devices 411 in communication with the host electronic device.

At step 404, the method 400 arranges, by one or more processors of the host electronic device, the requests in a queue. This step 404 can also include manipulating 414 the queue as well. Manipulations 414 can take a variety of forms.

In one or more embodiments, the queue is manipulated 414 at step 404 when a user interface of the host electronic device receives user input. One or more processors can then rearrange requests in the queue in response to the user input at step 404. This rearranging can move requests up in priority or down in priority.

The manipulation 414 can also comprise removing requests from the queue at step 404. In one or more embodiments, step 404 comprises receiving, with the user interface of the host electronic device, user input and removing, by one or more processors of the host electronic device, at least one request from the queue in response to the user input. Requests can be added at step 404 in a similar manner.

Step 404 can also comprise managing bump requests. Illustrating by example, in one or more embodiments step 404 comprises receiving, with the communication device of the host electronic device, a bump request from one of the first guest electronic device or the second guest electronic device and rearranging, with the one or more processors, entries of the queue in response to the bump requests.

Figure 5:
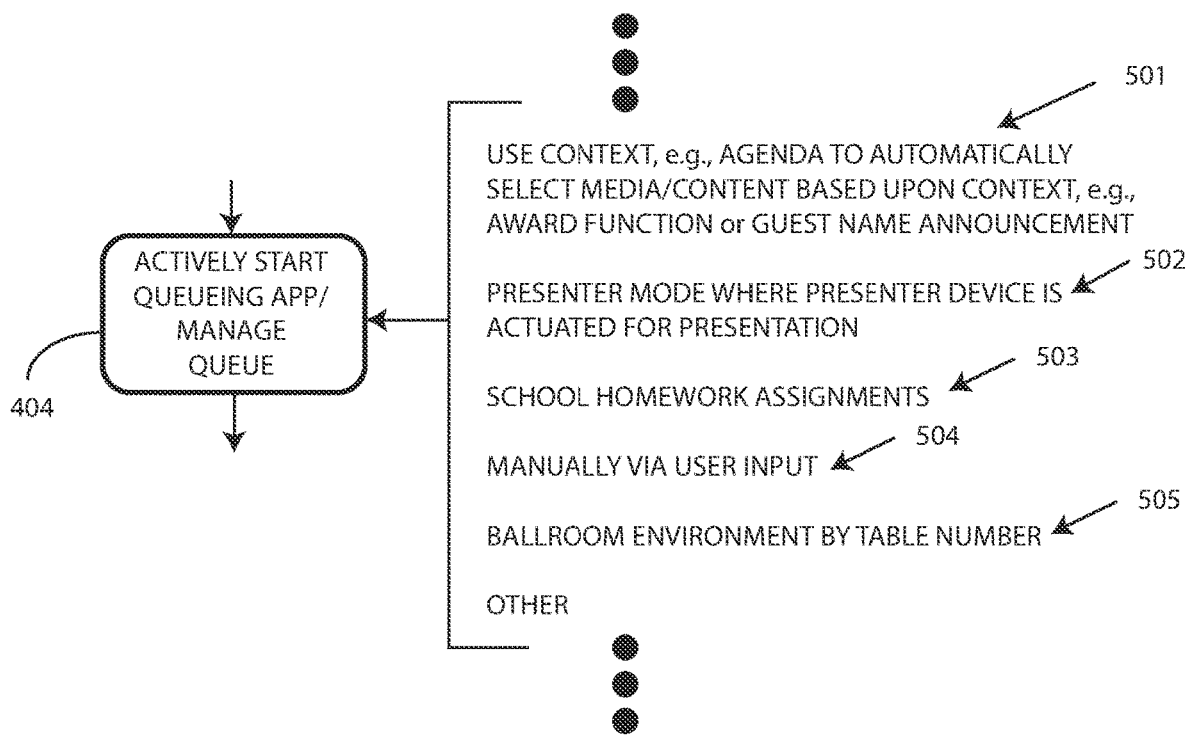
FIG. 5 illustrates one or more method steps in accordance with one or more embodiments of the disclosure.

Step 404 can be managed in other ways as well. Turning briefly to FIG. 5, illustrated therein are some alternate ways in which a queue can be managed in accordance with one or more embodiments of the disclosure at step 404. In one or more embodiments, context 501 can be used to manage the queue. Illustrating by example, a memory of the host electronic device can store an event agenda. One or more processors of the host electronic device can rearrange the queue as a function of the event agenda at step 404. The one or more processors can rearrange the queue as a function of context 501 such as when an award is given, when a guest's name is announced, and so forth.

In other embodiments, step 404 can comprise arranging the queue as a function of who is scheduled to be a presenter 502 at a meeting. Schoolwork assignments 503 can be presented to a class as previously described in accordance with a class roll. User input 504 from the host can add, delete, move up, or move down requests. Table numbers 505 in a banquet hall can be used to arrange the queue. These examples are illustrative only, as numerous others will be obvious to those of ordinary skill in the art having the benefit of this disclosure.

Turning now back to FIG. 4, in one or more embodiments, step 404 comprises presenting the queue on the user interface of the host electronic device as well. In one or more embodiments, the queue presented at step 404 identifies an order of requests received from the guest electronic device 411, a device type of the guest electronic devices 411 from which the requests are received, and a media content type of requested media content found in the requests. Such media content 413 can comprise audio content, visual content, multimedia content, webcam content, a schoolwork assignment, and so forth. Decision 405 determines whether a new principal request of the queue is ready for presentation. Where it is not, the previous media content identified by the previous principal request continues presentation at step 406. Otherwise, decision 405 selects the new principal request and the method 400 moves to step 407.

In one or more embodiments, step 407 comprises initiating, by one or more processors of the host electronic device, an application operating locally on a guest electronic device identified by the principal request. Illustrating by example, step 407 can comprise one of initiating the application operating locally on the first guest electronic device, thereby causing the communication device of the host electronic device to receive the media content, when the principal request is the first request or initiating the other application operating locally on the second guest electronic device, thereby causing the communication device of the host electronic device to receive other media content, when the principal request is the second request.

The media content is then received at step 408 and rendered at step 409. In one or more embodiments, step 409 renders the media content locally at the host electronic device. However, in other embodiments step 409 comprises the communication device of the host electronic device delivering the media content to a content presentation companion device for presentation to an environment in which the host electronic device and the plurality of guest electronic devices 411 are situated. Step 410 then updates the queue and the method 400 returns to decision 405.

Figure 6:
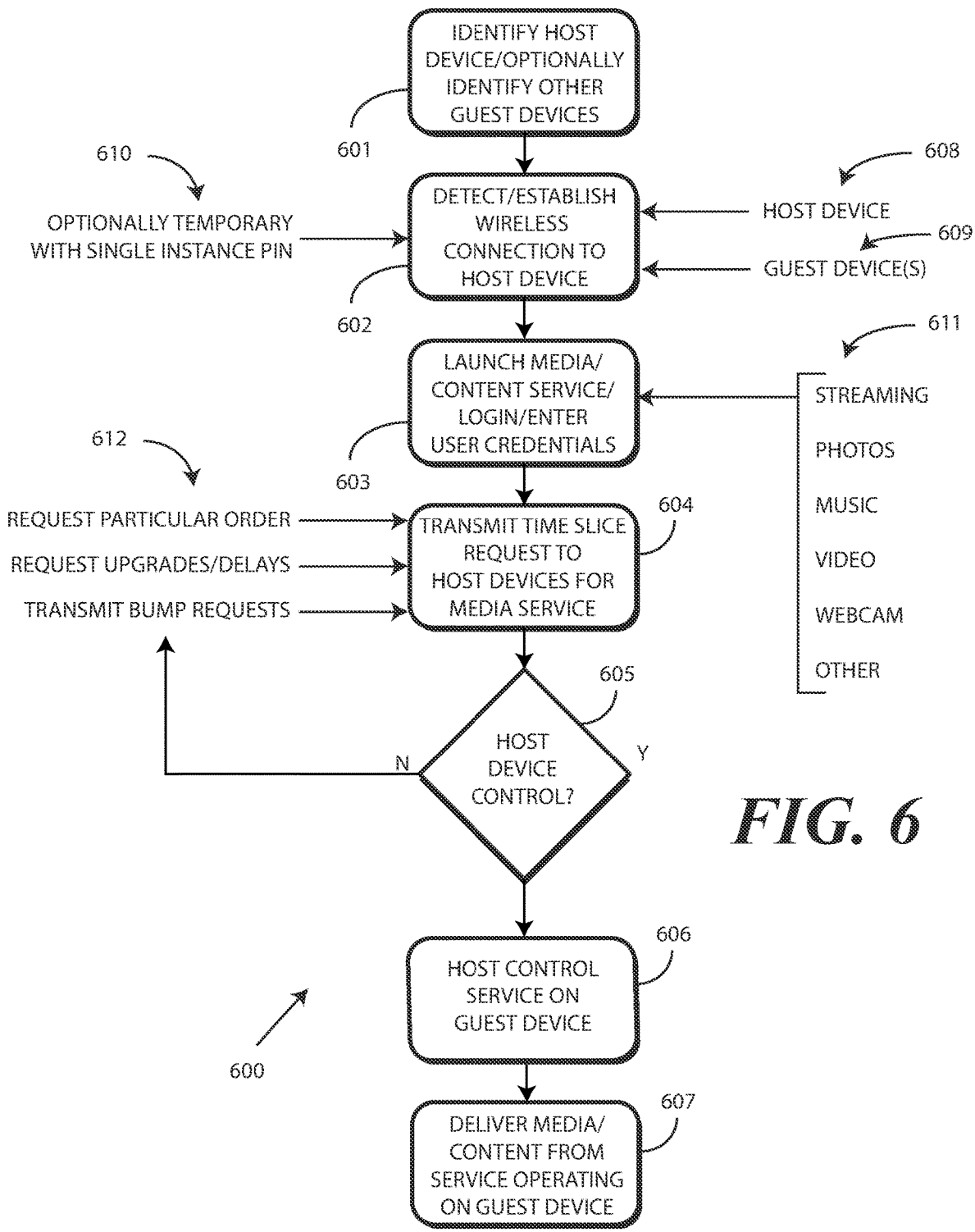
FIG. 6 illustrates another explanatory method in accordance with one or more embodiments of the disclosure.
Figure 7:
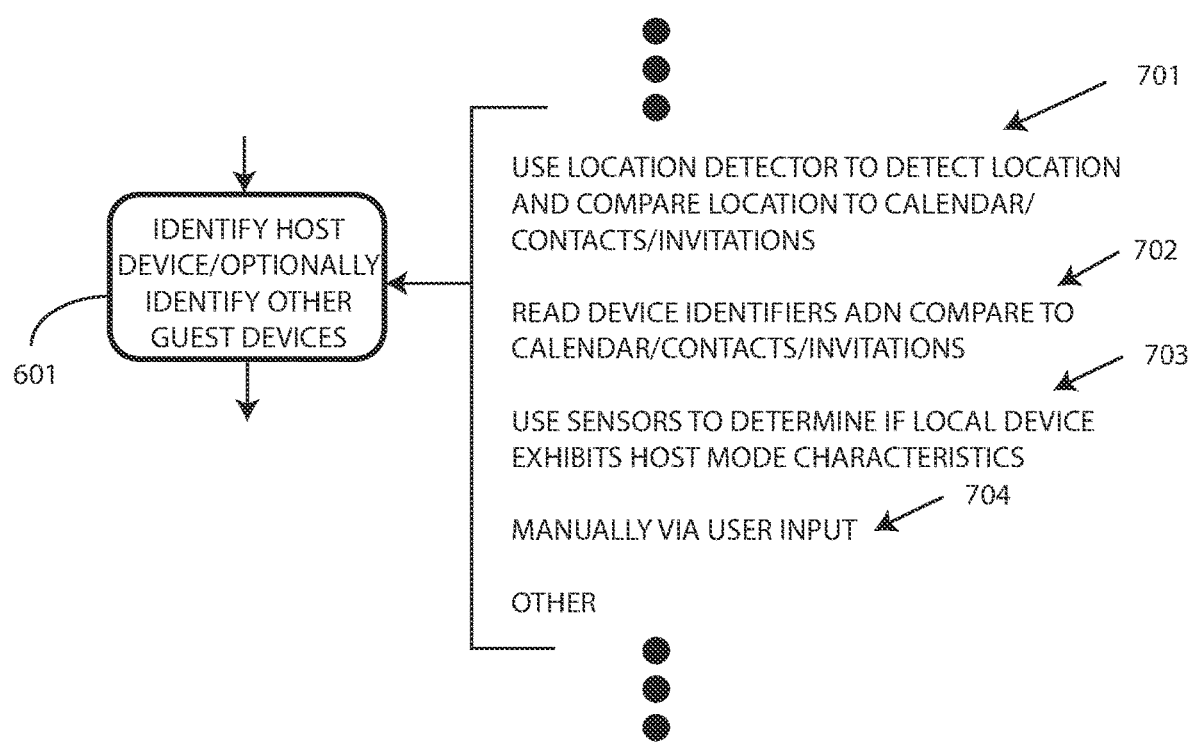
FIG. 7 illustrates one or more method steps in accordance with one or more embodiments of the disclosure.

Turning now to FIG. 6, illustrated therein is one explanatory method 600 for a guest electronic device. Beginning at step 601, one or more processors of the guest electronic device identify a host electronic device 608 operating within an environment of the guest electronic device. This step 601 can be performed in a variety of ways. Turning briefly to FIG. 6, illustrated therein are a few such ways. These are illustrative only, as others will be obvious to those of ordinary skill in the art having the benefit of this disclosure.

In one or more embodiments, the identifying occurring at step 601 comprises one or more processors of the guest electronic device identifying the host electronic device operating in the environment of the guest electronic device as a function of the location 701 of the environment detected by one or more sensors of the guest electronic device. In other embodiments, step 601 comprises one or more sensors of the guest electronic device identifying the host electronic device is operating within the environment of the guest electronic device when a location detector identifies a location matching a calendar event 702 received from the host electronic device and stored in a calendaring application operating locally on the guest electronic device.

In still other embodiments, one or more sensors of the guest electronic device can determine whether a particular electronic device operating within an environment of the guest electronic device exhibits host electronic device characteristics 703. Illustrating by example, if an electronic device operating in the environment of the guest electronic device has established electronic communication with multiple content presentation companion devices or other companion devices operating in the environment, examples of which include large displays, loudspeakers, lighting systems, door locks, and so forth, the guest electronic device may conclude that the electronic device is a host electronic device due to the fact that it is in control of systems of the location in which the guest electronic device is situated. Such control of local systems can be considered to be an exhibition of host electronic device characteristics 703. Similarly, if an electronic device is transmitting the identities of other guest electronic devices operating within the environment so that a guest electronic device can establish communication with those guest electronic devices, this may be considered a host electronic device characteristic 703 as well.

In other embodiments, step 601 can comprise a user interface of the guest electronic device receiving user input 704 identifying the host electronic device. This user interface could identify the host electronic device by telephone number, SSID, IP address, or by other techniques.

Turning now back to FIG. 6, at step 602 a communication device of the guest electronic device establishes electronic communication with the host electronic device 608. In one or more embodiments, the electronic communication comprises a single-instance PIN communication 610 that is enabled by the host electronic device 608.

In one or more embodiments, step 601 also comprises identifying, by one or more processors of the guest electronic device, at least one other guest electronic device 609 operating in the environment of the guest electronic device. Where this occurs, step 602 can optionally comprise establishing, with the communication device of the guest electronic device, another electronic communication with the at least one other guest electronic device 609.

At step 603, the one or more processors of the guest electronic device launch an application 611 operating locally on the guest electronic device capable of outputting media content. Examples of the application 611 operating locally on the guest electronic device include video and music streaming applications, photo applications, music applications, video applications, webcam applications, and other applications. In one or more embodiments, step 603 comprises the one or more processors of the guest electronic device prompting, at a user interface of the guest electronic device in response to identifying the host electronic device 608 at step 601, for a selection of the application 611 operating locally on the guest electronic device. Moreover, in one or more embodiments step 603 comprises unlocking a media content sharing feature set associated with the application 611 operating locally on the guest electronic device in response to establishing the electronic communication with the host electronic device 608. Illustrating by example, one or more processors of the guest electronic device may launch a ReadyFor™ feature in response to the communication device establishing the electronic communication with the host electronic device 608.

At step 604, the communication device of the guest electronic device delivers a request requesting presentation by the host electronic device 608 of the media content output from the application 611 operating locally on the guest electronic device. In one or more embodiments, this request indicates a time slice of a predefined event occurring in the environment of the guest electronic device during which the media content should be transmitted to the host electronic device 608.

In one or more embodiments, the delivery of the request at step 604 is triggered by a predefined event. Illustrating by example, one or more sensors of the guest electronic device may detect an audible announcement of a name of the owner of the guest electronic device, which triggers a request for a webcam operation to capture and share depictions of the owner of the guest electronic device. Decision 605 determines whether the host electronic device 608 has transmitted an initiation command initiating the application 611 operating locally on the guest electronic device. Where this has not occurred, the guest electronic device can transmit a queuing interaction 612 at step 606. The queuing interaction 612 can take various forms.

In one or more embodiments, the queueing interaction 612 causes one or more requests to be rearranged in a queue of a host electronic device 608. In one or more embodiments, the queueing interaction 612 can indicate that the guest electronic device will be exiting the environment in which both the guest electronic device and the host electronic device 608 are operating within a predetermined time frame. If the guest owning the guest electronic device wants to hear their favorite song, the queueing interaction 612 may indicate that a request to play a favorite song of the owner of the guest electronic device be presented in the environment in which both the guest electronic device and the host electronic device 608 are operating before the predetermined time frame expires.

In other embodiments, the queuing interaction 612 comprises a bump request. The bump request may request the presentation of media content prior to presentation of other media content output from another application operating locally on another guest electronic device also electronically in communication with the host electronic device 608. The bump request may indicate that the guest electronic device will be exiting the environment of the host electronic device 608 at a specified time. The bump request may indicate that the application 611 operating locally on the guest electronic device will be unavailable to deliver the media content to the host electronic device 608 during a specified duration of time. The queueing interaction 612 could even comprise a cease request transmitted to the host electronic device 608 removing the request from the queue stored in the host electronic device 608 in response to user input received by a user interface of the guest electronic device. Other queueing interactions will be obvious to those of ordinary skill in the art having the benefit of this disclosure.

At step 606, a communication device of the guest electronic device receives an initiation command from the host electronic device 608 initiating the application 611 operating locally on the guest electronic device, thereby causing the communication device to transmit the media content to the host electronic device 608 for presentation by the host electronic device 608. Step 607 can optionally comprise the host electronic device 608 delivering the media content to a content presentation companion device as previously described.

Figure 8:
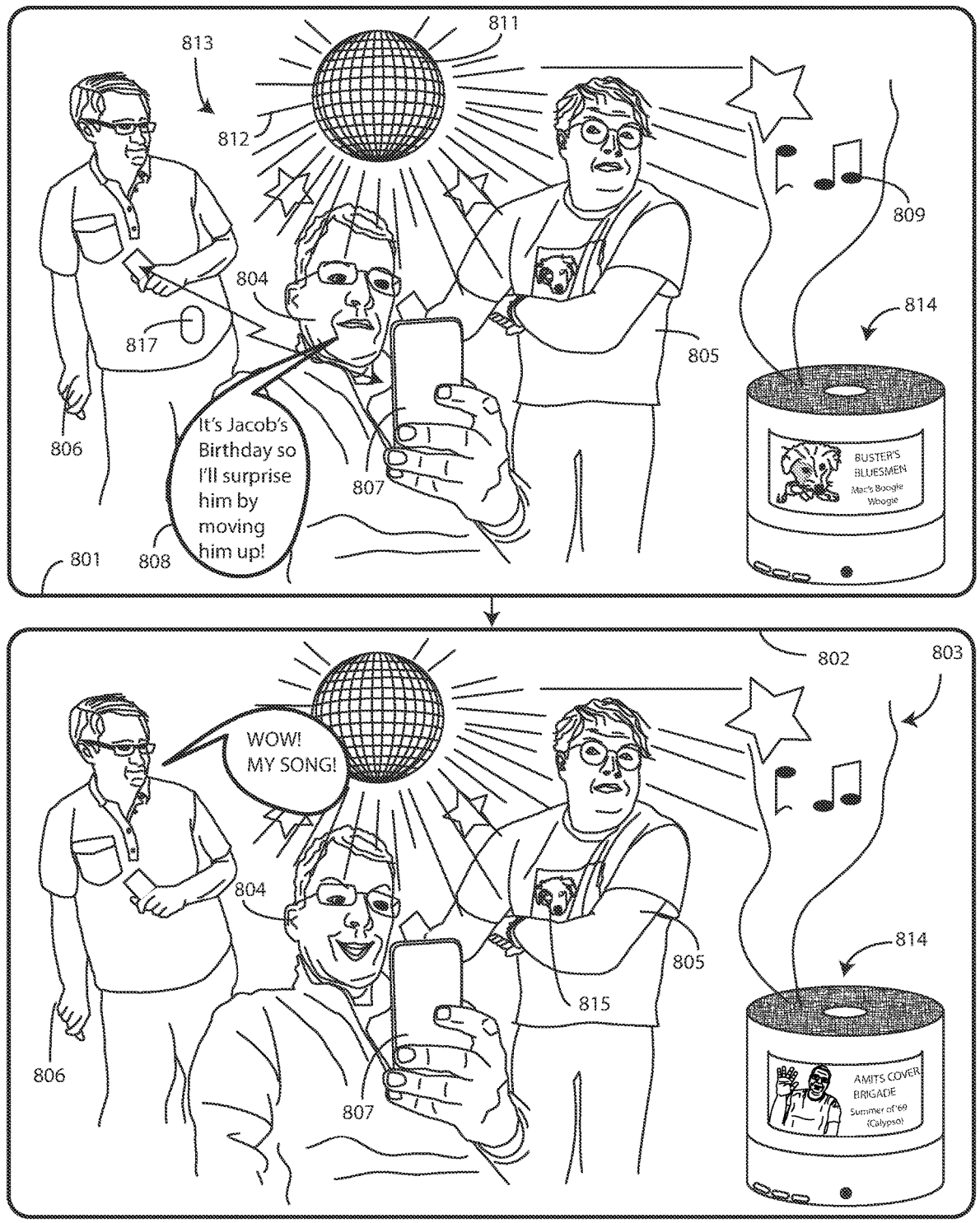
FIG. 8 illustrates one or more method steps in accordance with one or more embodiments of the disclosure.

Turning now to FIG. 8, illustrated therein are one or more method steps in accordance with one or more embodiments of the disclosure. Beginning at step 801, a party 813 is occurring. The host 804 of the party 813 is using a content presentation companion device 814 to play music identified by requests sent by guest electronic devices belonging to various guests 805,806. In addition, the host 804 is showing pictures from guest electronic devices to the guests 805,806 of the party 813 on another content presentation companion device (not shown) as well. Content presentation companion device 814 is playing "Mac's Boogie Woogie" 810, by the legendary Buster and his Bluesmen. The guest electronic device belonging to guest 806 sends a request for the host electronic device 807 to spin a disco ball 811, while the guest electronic device belonging to another guest 805 sends a request for the host electronic device 807 to turn on spotlights 812, which reflect from the disco ball 811. The party 813 is jumping, to be sure.

There is only one problem. Guest 806 needs to leave. However, he wants to hear his favorite song before he goes. Accordingly, guest 806 uses his guest electronic device to transmit a queueing interaction 817 indicating that he will be exiting the party 813 within a predetermined time frame.

The queuing interaction 817 indicates that a request to play a favorite song, "The Summer of '69," should be presented at the party 813.

Seeing this request, the host 804 says in a statement 808, "It's Jacob's birthday—I'll surprise him by moving him up." Accordingly, in response to the queuing interaction, the host 804 manipulates the queue to move the request up to become the principal request.

At step 802, one or more processors of the host electronic device 807 initiate an application operating locally on the guest electronic device of guest 806, thereby causing the application operating locally on the guest electronic device belonging to guest 806 to start playing "The Summer of 69," calypso style, by Amit's Cover Brigade. This media content is delivered from the guest electronic device belonging to guest 806, to the host electronic device 807, to the content presentation companion device 814.

The party is rocking. Guest 805, still a huge Buster fan with a picture 815 of Buster on his shirt, turns out to be a huge Amit Cover Brigade fan as well. Calypso music 803 is quite popular after all. Guest 805 is buoyant and continues to rock on. The party is a complete success.

Figure 9:
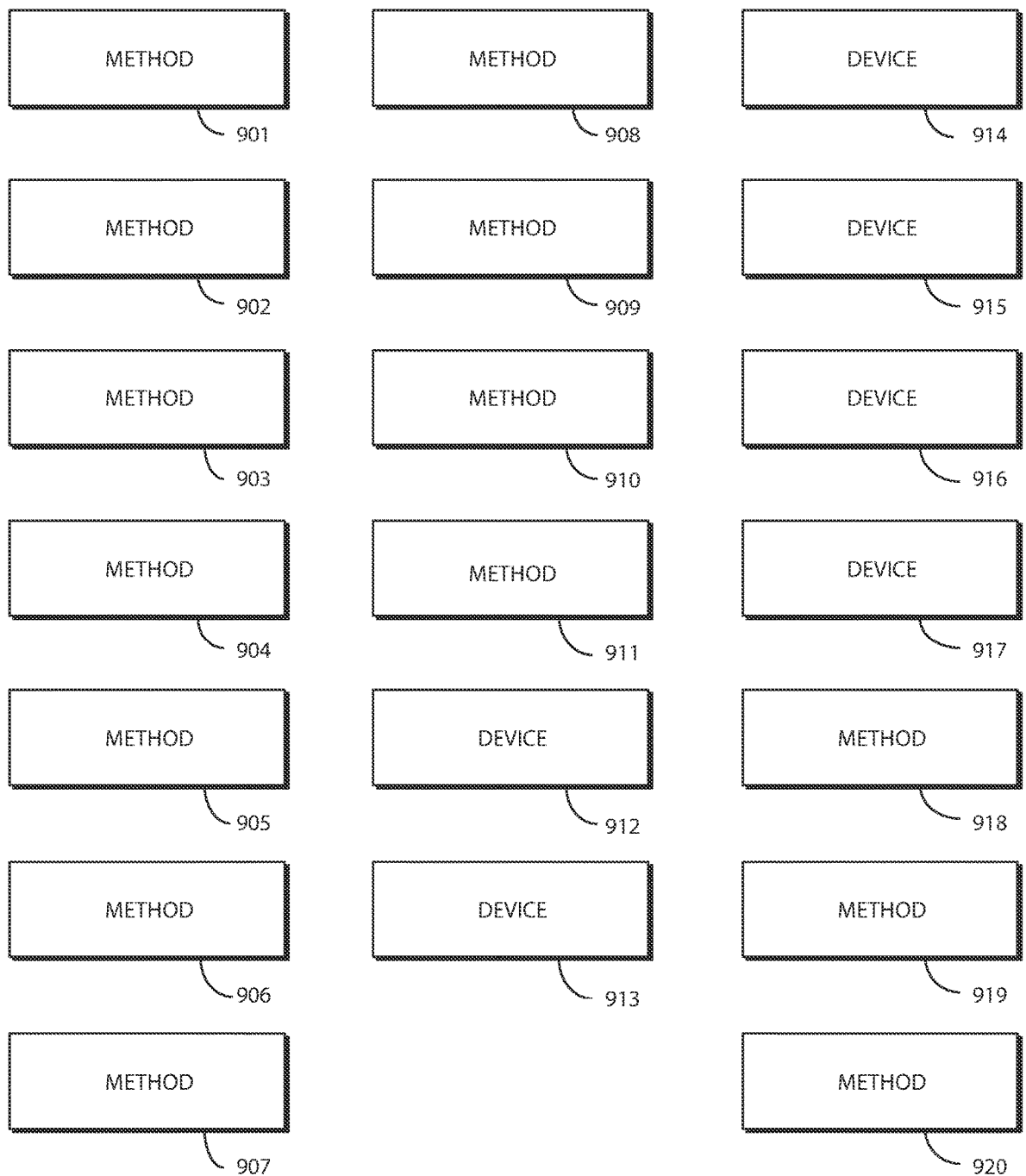
FIG. 9 illustrates various embodiments of the disclosure.
Figure 10:
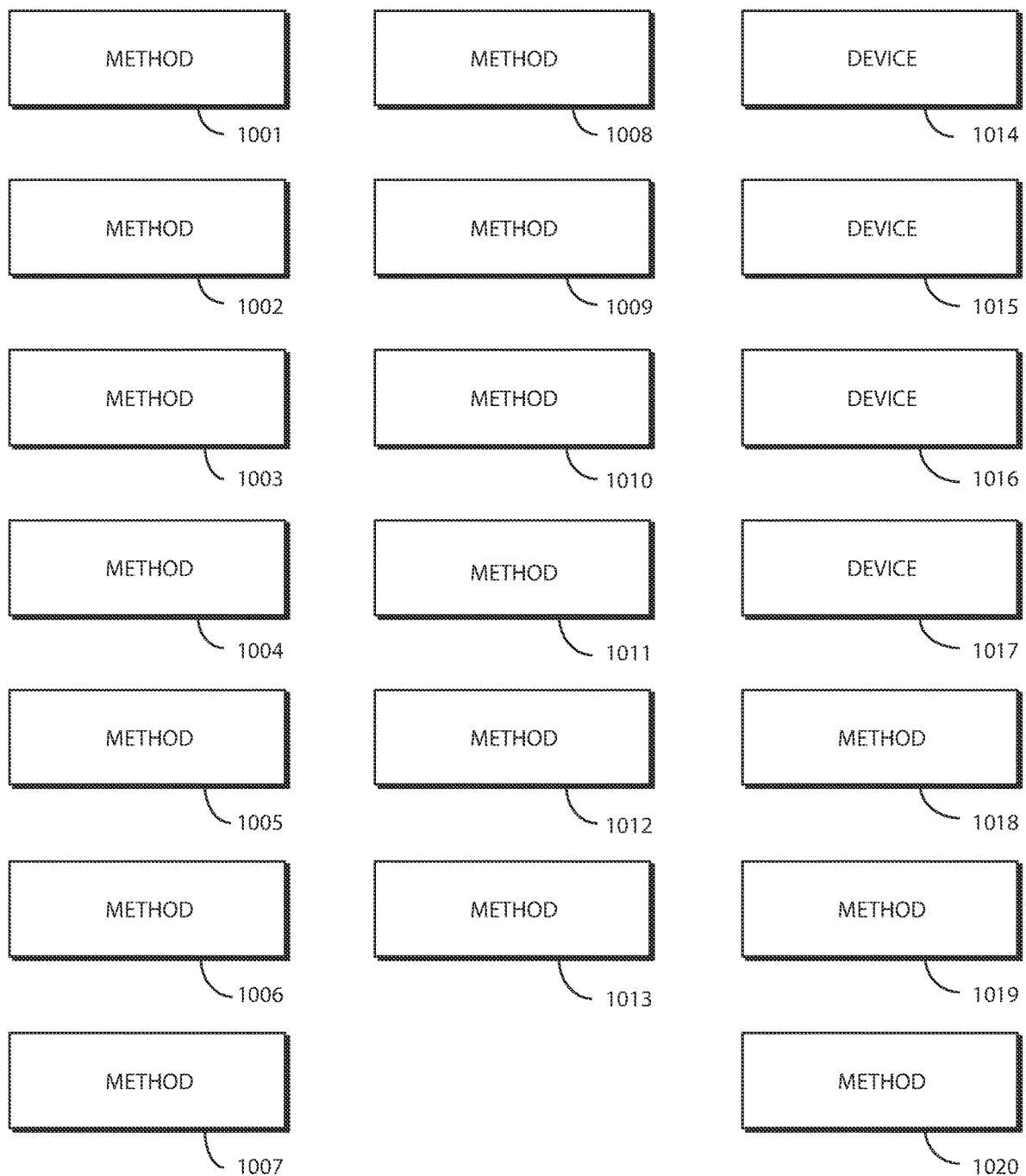
FIG. 10 illustrates various other embodiments of the disclosure.

Turning now to FIGS. 9-10, illustrated therein are various embodiments of the disclosure. The embodiments of FIGS. 9-10 are shown as labeled boxes in FIGS. 9-10 due to the fact that the individual components of these embodiments have been illustrated in detail in FIGS. 1-8, which precede FIGS. 9-10. Accordingly, since these items have previously been illustrated and described, their repeated illustration is no longer essential for a proper understanding of these embodiments. Thus, the embodiments are shown as labeled boxes.

Beginning at 901, a method in a host electronic device comprises establishing, with a communication device of the host electronic device, electronic communication with at least a first guest electronic device and a second guest electronic device. At 901, the method comprises receiving, with the communication device, at least a first request requesting presentation of media content output from an application operating locally on the first guest electronic device from the first guest electronic device and a second request requesting presentation of other media content output from another application operating locally on the second guest electronic device from the second guest electronic device.

At 901, the method comprises arranging, by one or more processors of the host electronic device, the first request and the second request in a queue. At 901, the method comprises selecting, by the one or more processors, a principal request from the queue. At 901, the method comprises initiating, by the one or more processors, one of the application operating locally on the first guest electronic device, thereby causing the communication device to receive the media content, when the principal request is the first request, or the other application operating locally on the second guest electronic device, thereby causing the communication device to receive the other media content, when the principal request is the second request.

At 902, the method of 901 further comprises receiving, by a user interface of the host electronic device, user input and rearranging, by the one or more processors, requests in the queue in response to the user input. At 903, the method of 902 further comprises receiving, by the user interface, other user input and removing, by the one or more processors, at least one request from the queue in response to the other user input.

At 904, the method of 903 further comprises receiving, with the communication device, a bump request from one of the first guest electronic device or the second guest electronic device and rearranging, with the one or more processors, entries of the queue in response to the bump request. At 905, the method of 904 further comprises disconnecting, by the communication device, the electronic communication with the first guest electronic device between receiving the first request and selecting the first request from the queue.

At 906, the electronic communication of 905 comprises a single-instance PIN communication that is enabled only when requests or media content from guest electronic devices are received. At 907, the method of 902 further comprises presenting, by the one or more processors, the queue on the user interface.

At 908, the queue of 907 identifies an order of requests received from guest electronic devices, a device type of guest electronic devices from which the requests are received, and a media content type of requested media content found in the requests. At 909, the media content of 908 comprises webcam content. At 910, the media content of 903 comprises streaming content streamed by the application operating locally on the first guest electronic device. At 911, the method of 901 further comprises transmitting, with the communication device of the host electronic device, an identification the first guest electronic device to the second guest electronic device enabling the second guest electronic device to establish other electronic communication with the first guest electronic device.

At 912, a host electronic device comprises a communication device in communication with a plurality of guest electronic devices. At 912, the host electronic device comprises one or more processors.

At 912, the one or more processors arrange requests for presentation of media content from applications operating locally on each guest electronic device of the plurality of guest electronic devices received by the communication device in a queue. At 912, when a principal request is selected, the one or more processors cause the communication device to initiate an application identified by the principal request, thereby causing the media content identified by the principal request to be delivered to the communication device.

At 913, the communication device of 912 delivers the media content to a companion electronic device for presentation to an environment within which the host electronic device and the plurality of guest electronic devices are situated. At 914, the host electronic device of 913 further comprises a user interface receiving user input, wherein the one or more processors re-arrange the queue in response to the user input. At 915, the one or more processors of 914 re-arrange the queue by deleting at least one request from the queue.

At 916, the host electronic device of 914 further comprises a memory operable with the one or more processors and storing an event agenda. At 916, the one or more processors re-arrange the queue as a function of the event agenda. At 917, the one or more processors of 914 present the queue on the user interface.

At 918, a method in a host electronic device comprises receiving, by a communication device of the host electronic device, requests for presentation of media content generated by applications operating locally on a plurality of guest electronic devices to an environment in which both the host electronic device and the plurality of guest electronic devices are situated. AT 918, the method comprises arranging, by one or more processors, the requests in a queue in accordance with a prioritization.

At 918, the method comprises selecting a principal request from the queue. At 918, the method comprises causing, by the one or more processors using the communication device, an application identified by the principal request to generate the media content locally on a guest electronic device identified in the principal request. At 918, the method comprises receiving, by the communication device, the media content from the application identified by the principal request and causing, by the one or more processors, presentation of the media content.

At 919, the method of 918 comprises delivering, by the communication device, the media content to a companion electronic device. At 920, the application of 919 identified by the principal request comprises a webcam application and the media content comprises a schoolwork assignment.

Turning now to FIG. 10, at 1001 a method in a guest electronic device comprises identifying, by one or more processors of the guest electronic device, a host electronic device operating within an environment of the guest electronic device. At 1001, the method comprises establishing, with a communication device of the guest electronic device, electronic communication with the host electronic device.

At 1001, the method comprises delivering, with the communication device to the host electronic device, a request requesting presentation by the host electronic device of media content output from an application operating locally on the guest electronic device. At 1001, the method comprises receiving, by the communication device, an initiation command from the host electronic device initiating the application operating locally on the guest electronic device, thereby causing the communication device to transmit the media content to the host electronic device for presentation by the host electronic device.

At 1002, the request of 1001 indicates a time slice of a predefined event occurring in the environment of the guest electronic device during which the media content should be transmitted to the host electronic device. At 1003, the method of 1001 further comprises prompting, by the one or more processors of the guest electronic device at a user interface of the guest electronic device, for a selection of the application operating locally on the guest electronic device in response to the identifying the host electronic device operating with the environment of the guest electronic device.

At 1004, the method of 1001 further comprises unlocking, a media content sharing feature set associated with the application operating locally on the guest electronic device in response to the establishing the electronic communication with the host electronic device. At 1005, the method of 1001 further comprises receiving, by a user interface of the guest electronic device, user input and transmitting, with the communication device, a bump request to the host electronic device in response to the user input.

At 1006, the bump request of 1005 requests the presentation of the media content occur prior to presentation of other media content output from another application operating locally on another guest electronic device also electronically in communication with the host electronic device. At 1007, the bump request of 1005 further indicates that the guest electronic device will be exiting the environment of the host electronic device at a specified time. At 1008, the bump request of 1005 further indicates that the application operating locally on the guest electronic device will be unavailable to deliver the media content to the host electronic device during a specified duration of time.

At 1009, the method of 1001 further comprises receiving, by a user interface, user input. At 1009, the method comprises transmitting, with the communication device, a cease request to the host electronic device removing the request from a queue stored in the host electronic device in response to the user input.

At 1010, the delivering of 1001 the request requesting presentation of media content output from the application operating locally on the guest electronic device is triggered by a predefined event. At 1011, the predefined event of 1010 comprises one or more sensors of the guest electronic device detecting an audible announcement of a name of an owner of the guest electronic device.

At 1012, the application operating locally on the guest electronic device of 1011 comprises a webcam operation and media content comprises depictions of the owner of the guest electronic device. At 1013, the method of 1001 further comprises identifying, by the one or more processors of the guest electronic device, another guest electronic device operating within the environment of the guest electronic device and establishing, with the communication device of the guest electronic device, another electronic communication with the other guest electronic device.

At 1014, a guest electronic device comprises one or more processors operable with one or more sensors. At 1014, the one or more processors identify a host electronic device operating within an environment of the guest electronic device in response to signals from the one or more sensors. At 1014, the guest electronic device comprises a communication device establishing electronic communication with the host electronic device in response to the one or more sensors identifying the host electronic device operating within the environment of the guest electronic device. At 1014, the one or more processors, in response to the communication device establishing electronic communication with the host electronic device, deliver a request requesting presentation, by the host electronic device, of media content output from an application operating locally on the guest electronic device during a time slice of a predefined event during which both the host electronic device and the guest electronic device are operating within the environment of the guest electronic device.

At 1015, the one or more sensors of 1014 identify the host electronic device is operating within the environment of the guest electronic device when a location detector identifies a location matching a calendar event received from the host electronic device and stored in a calendaring application operating locally on the guest electronic device. At 1016, the application operating locally on the guest electronic device of 1014 comprises a webcam and the media content depicts images of an owner of the guest electronic device captured by the webcam. At 1017, the electronic communication of 1014 comprises a single-instance personal identification number (PIN) communication that is enabled by the host electronic device.

At 1018, a method in a guest electronic device comprises transmitting, by a communication device of the guest electronic device, one or more requests for presentation, by a host electronic device, of one or more media content offerings generated by one or more applications operating locally on the guest electronic device, to an environment in which both the host electronic device and the guest electronic device are situated. At 1018, the method comprises thereafter transmitting, by the communication device of the guest electronic device, a queuing interaction causing the one or more requests to be rearranged in a queue of the host electronic device and receiving, with the communication device of the guest electronic device when at least one request of the one or more requests becomes a principal request in the queue of the host electronic device, an instruction from the host electronic device causing an application operating locally on the guest electronic device that is identified by the principal request to generate media content identified by the principal request. At 1018, the method comprises transmitting, by the communication device, the media content from the application operating locally on the guest electronic device that is identified by the principal request to the host electronic device, thereby causing the host electronic device to present the media content to the environment in which both the host electronic device and the guest electronic device are situated.

At 1019, the method of 1018 further comprises identifying, with one or more processors of the guest electronic device, that the host electronic device is operating in the environment as a function of a location of the environment detected by one or more sensors of the guest electronic device. At 1020, the queueing interaction of 1018 indicates that the guest electronic device will be exiting the environment in which both the guest electronic device and host electronic device are operating within a predetermined time frame and that a request to play a favorite song of an owner of the guest electronic device be presented to the environment in which both the guest electronic device and the host electronic device are operating before the predetermined time frame expires.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a host electronic device, the method comprising:
   establishing, with a communication device of the host electronic device, electronic communication with at least a first guest electronic device and a second guest electronic device;
   receiving, with the communication device, at least:
   a first request requesting presentation of media content output from an application operating locally on the first guest electronic device from the first guest electronic device; and
   a second request requesting presentation of other media content output from another application operating locally on the second guest electronic device from the second guest electronic device;
   arranging, by one or more processors of the host electronic device, the first request and the second request in a queue;

selecting, by the one or more processors, a principal request from the queue;
initiating, by the one or more processors, one of:
the application operating locally on the first guest electronic device, thereby causing the communication device to receive the media content, when the principal request is the first request; or
the another application operating locally on the second guest electronic device, thereby causing the communication device to receive the other media content, when the principal request is the second request.

2. The method of claim 1, further comprising:
receiving, by a user interface of the host electronic device, user input; and
rearranging, by the one or more processors, requests in the queue in response to the user input.

3. The method of claim 2, further comprising:
receiving, by the user interface, other user input; and
removing, by the one or more processors, at least one request from the queue in response to the other user input.

4. The method of claim 3, further comprising:
receiving, with the communication device, a bump request from one of the first guest electronic device or the second guest electronic device; and
rearranging, with the one or more processors, entries of the queue in response to the bump request.

5. The method of claim 4, further comprising disconnecting, by the communication device, the electronic communication with the first guest electronic device between receiving the first request and selecting the first request from the queue.

6. The method of claim 5, the electronic communication comprising a single-instance personal identification number (PIN) communication that is enabled only when requests or media content from guest electronic devices are received.

7. The method of claim 2, further comprising presenting, by the one or more processors, the queue on the user interface.

8. The method of claim 7, the queue identifying an order of requests received from guest electronic devices, a device type of guest electronic devices from which the requests are received, and a media content type of requested media content found in the requests.

9. The method of claim 8, wherein the media content type comprises one of visible content without audio, audio content without video, or audiovisual content.

10. The method of claim 9, wherein the media content comprises webcam content.

11. The method of claim 9, wherein the media content comprises streaming content streamed by the application operating locally on the first guest electronic device.

12. A host electronic device, comprising:
a communication device in communication with a plurality of guest electronic devices; and
one or more processors, the one or more processors:
arranging requests for presentation of media content from applications operating locally on each guest electronic device of the plurality of guest electronic devices received by the communication device in a queue; and
when a principal request is selected, causing the communication device to initiate an application identified by the principal request, thereby causing the media content identified by the principal request to be delivered to the communication device.

13. The host electronic device of claim 12, wherein the communication device delivers the media content to a companion electronic device for presentation to an environment within which the host electronic device and the plurality of guest electronic devices are situated.

14. The host electronic device of claim 13, further comprising a user interface receiving user input, wherein the one or more processors re-arrange the queue in response to the user input.

15. The host electronic device of claim 14, wherein the one or more processors re-arrange the queue by deleting at least one request from the queue.

16. The host electronic device of claim 14, further comprising a memory operable with the one or more processors and storing an event agenda, wherein the one or more processors re-arrange the queue as a function of the event agenda.

17. The host electronic device of claim 14, wherein the one or more processors present the queue on the user interface.

18. A method in a host electronic device, comprising:
receiving, by a communication device of the host electronic device, requests for presentation of media content generated by applications operating locally on a plurality of guest electronic devices to an environment in which both the host electronic device and the plurality of guest electronic devices are situated;
arranging, by one or more processors, the requests in a queue in accordance with a prioritization;
selecting a principal request from the queue;
causing, by the one or more processors using the communication device, an application identified by the principal request to generate the media content locally on a guest electronic device identified in the principal request;
receiving, by the communication device, the media content from the application identified by the principal request; and
causing, by the one or more processors, presentation of the media content.

19. The method of claim 18, wherein the causing comprises delivering, by the communication device, the media content to a companion electronic device.

20. The method of claim 19, wherein the application identified by the principal request comprises a webcam application and the media content comprises a schoolwork assignment.

* * * * *